(12) United States Patent
Narasimhan et al.

(10) Patent No.: US 10,546,296 B2
(45) Date of Patent: Jan. 28, 2020

(54) PUBLIC LEDGER AUTHENTICATION SYSTEM

(71) Applicant: PAYPAL, INC., San Jose, CA (US)

(72) Inventors: Srivathsan Narasimhan, San Jose, CA (US); Yashovardhana Samethanahalli Kote, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 622 days.

(21) Appl. No.: 15/296,481

(22) Filed: Oct. 18, 2016

(65) Prior Publication Data

US 2017/0300912 A1 Oct. 19, 2017

Related U.S. Application Data

(63) Continuation-in-part of application No. 15/098,079, filed on Apr. 13, 2016.

(51) Int. Cl.
*G06Q 20/40* (2012.01)
*G06Q 20/38* (2012.01)
*G06Q 20/36* (2012.01)

(52) U.S. Cl.
CPC ......... *G06Q 20/4014* (2013.01); *G06Q 20/36* (2013.01); *G06Q 20/3829* (2013.01); *G06Q 2220/00* (2013.01); *H04L 2463/102* (2013.01)

(58) Field of Classification Search
CPC .............................................. G06Q 20/4014
See application file for complete search history.

(56) References Cited

U.S. PATENT DOCUMENTS

| 7,797,196 | B1* | 9/2010 | Aaron | G06Q 30/0603 705/26.1 |
| 9,298,806 | B1* | 3/2016 | Vessenes | G06Q 20/065 |
| 2008/0015951 | A1* | 1/2008 | Kerker | G06Q 10/0875 705/7.29 |
| 2015/0100468 | A1* | 4/2015 | Blackhurst | G06Q 40/02 705/35 |

(Continued)

OTHER PUBLICATIONS

Antonopoulos, Andreas, "Mastering Bitcoin," O'Reilly, 2014, all pages. (Year: 2014).*

(Continued)

*Primary Examiner* — Jacob C. Coppola
(74) *Attorney, Agent, or Firm* — Haynes and Boone, LLP

(57) ABSTRACT

Systems and methods for public ledger authentication include receiving a first previous authentication public ledger address and a first current authentication public ledger address from a user. A verified static user key is identified in a public ledger using the first previous authentication public ledger address. A second current authentication public ledger address is then provided to the user for use in the current authentication attempt. Authentication attempt information is determined that includes a number of authentication attempts by the user, and used in a hash operation with the verified static user key to generate a first user authentication key. A second user authentication key is retrieved from the public ledger that was sent from the first current authentication public ledger address to the second current authentication public ledger address in a transaction, and the user is authenticated if the second user authentication key matches the first user authentication key.

20 Claims, 16 Drawing Sheets

(56) References Cited

U.S. PATENT DOCUMENTS

| | | | | |
|---|---|---|---|---|
| 2015/0379488 A1* | 12/2015 | Ruff | ................. | G06Q 20/108 |
| | | | | 705/36 R |
| 2016/0071108 A1* | 3/2016 | Caldera | ............ | G06Q 20/4016 |
| | | | | 705/75 |
| 2016/0180305 A1* | 6/2016 | Dresser | ............... | G06Q 20/223 |
| | | | | 705/40 |
| 2017/0279801 A1* | 9/2017 | Andrade | ............ | H04L 63/0861 |
| 2017/0300901 A1* | 10/2017 | Kote | ................ | G06Q 20/3829 |
| 2017/0300978 A1* | 10/2017 | Narasimhan | ....... | G06Q 30/0279 |

OTHER PUBLICATIONS

Reid F., Harrigan M. (2013) An Analysis of Anonymity in the Bitcoin System. In: Altshuler Y., Elovici Y., Cremers A., Aharony N., Pentland A. (eds) Security and Privacy in Social Networks. Springer, New York, NY (Year: 2013).*

Lischke et al., "Analyzing the Bitcoin Network: The First Four Years," Future Internet, 2016, all pages. (Year: 2016).*

Maesa et al., "Uncovering the Bitcoin blockchain: an analysis of the full users graph," 2016 IEEE International Conference on Data Science and Advanced Analytics, IEEE, 2016, all pages. (Year: 2016).*

* cited by examiner

PUBLIC LEDGER AUTHENTICATION SYSTEM

CROSS REFERENCE TO RELATED APPLICATION

The present application is a Continuation-In-Part of U.S. patent application Ser. No. 15/098,079, filed Apr. 13, 2016, entitled "PUBLIC LEDGER AUTHENTICATION SYSTEM," the disclosure of which is incorporated herein by reference. The present application is related to U.S. Utility patent application Ser. No. 15/195,030, filed on Jun. 28, 2016, entitled "PUBLIC LEDGER AUTHENTICATION SYSTEM," the disclosure of which is incorporated herein by reference.

BACKGROUND

Field of the Disclosure

The present disclosure generally relates to electronic authentication systems and more particularly to a public ledger authentication system that may be used to authenticate electronic transactions.

Related Art

More and more consumers conducting electronic transactions over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile transactions are growing very quickly.

Online and/or mobile payment systems typically require authentication by their users in order to ensure that a user accessing a payment account and executing payment transactions using that payment account are authorized to do so. Conventional authentication systems typically require a user that is attempting to access a payment account and/or execute a payment transaction to provide authentication credentials in the form of a username and password, a biometric identifier (e.g., a thumb scan), and/or other conventional authentication credentials known in the art. However, many users utilize easily guessed authentication credentials that compromise the security of their payment account, or do not have biometric devices that allow for the higher security biometric identifier authentication discussed above.

Thus, there is a need for an improved authentication system.

DETAILED DESCRIPTION

Figure 1A:
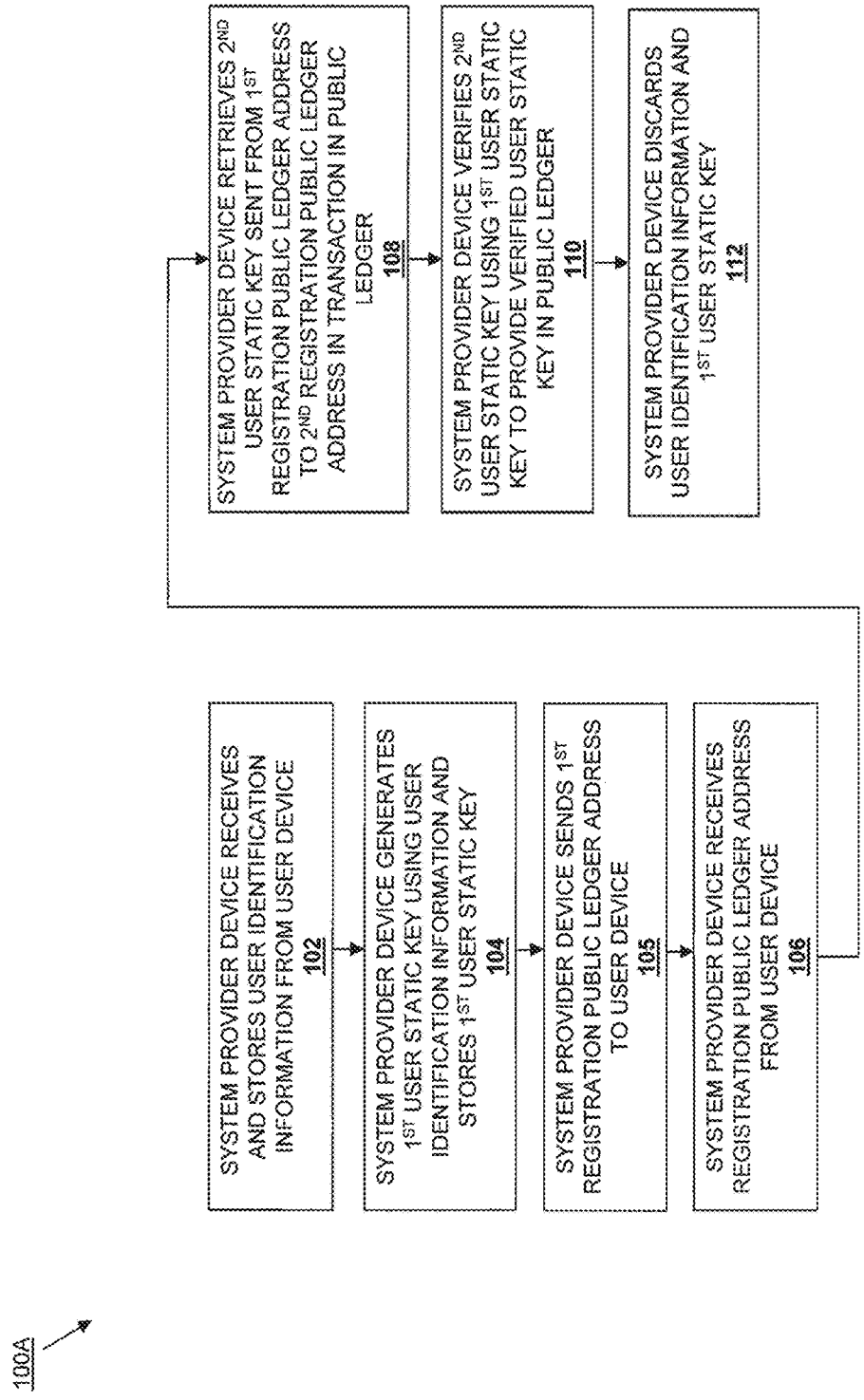
FIG. 1A is a flow chart illustrating an embodiment of a registration method for registering with a public ledger authentication system.

Some embodiments of the present disclosure provide systems and methods for authentication via a public ledger to access, for example, a financial account, a website, and/or any other secure system known in the art. The public ledger may be dedicated for authentication (e.g., an "authentication public ledger), or may be provided as part of a crypto currency public ledger, to allow for the authentication of users to secure systems by a system provider. The public ledger authentication described herein includes an registration method in which each of a user and a system provider perform a common hash operation on user identification information (e.g., a user name, a user address, a user phone number, a user date of birth, a user social security number, etc.) to generate respective first and second static user keys. The system provider may identify a first registration public ledger address to the user, the user may identify a second registration public ledger address to the system provider, and the user may then subsequently send the first static user key to the first registration ledger address from the second registration public ledger address in a transaction in the public ledger. The system provider may then access that registration ledger address via the public ledger (using the identifications of the first and second registration ledger addresses to reference the public ledger) to retrieve the first static user key and register the user with the system if the first static user key matches the second static user key generated by the system provider. The first static user key in the public ledger then becomes a verified static user key in the public ledger that may be used for subsequent authentication of the user, and the system provider may erase or otherwise discard the user identification information and the second static user key.

Following registration, the user may authenticate to the secure system in an authentication method by sending the system provider a first previous authentication public ledger address that was used in a previous authentication attempt and a first current authentication public ledger address for use in the current authentication attempt. The system provider may use the first previous authentication public ledger address to access a database that identifies previous authentication public ledger addresses used by the user in previous authentication attempts and allows for the determination of a number of previous authentication attempts by the user, and identify the verified static user key in the public ledger. The system provider may then perform a hash operation using the number of previous authentication attempts and the verified static user key to generate a first user authentication key. The system provider then provides the user a second current authentication public ledger address for use in the current authentication attempt.

The user may also perform the hash operation using the number of previous authentication attempts and the verified static user key (both of which may be stored by the user in a transaction wallet) to generate a second user authentication key, and send the second user authentication key from the first current authentication public ledger address to the second current authentication public ledger address in a transaction on the public ledger. The system provider may then check the transaction sent from the first current authentication public ledger address to the second current authentication public ledger address in the public ledger to retrieve the second user authentication key and authenticate the user with the system if the second user authentication key matches the first user authentication key generated by the system provider.

Referring now to FIGS. 1A, 1B, 2, and 3, a method 100 for providing public ledger authentication is illustrated. In the illustrated embodiment, the method 100 includes a registration sub-method 100A and an authentication sub-method 100B. In some embodiments of the method 100 described below, one or more system provider devices may operate to perform or enable the method 100. For example, a distributed group of devices may operate to maintain the public ledger discussed below by creating (a.k.a., "mining") a distributed crypto currency, processing transactions involving the distributed crypto currency, and/or otherwise performing actions that provide the public ledger utilized in the method 100 as detailed below. In a specific example, a payment service provider such as, for example, PayPal, Inc. of San Jose, Calif., may utilize a payment service provider device to perform the method 100 discussed below, and in some embodiments may operate in cooperation with one or more other system providers (via their system provider devices), payees (via their payee devices), payers (via their payer devices), and/or users (via their user devices) to perform the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
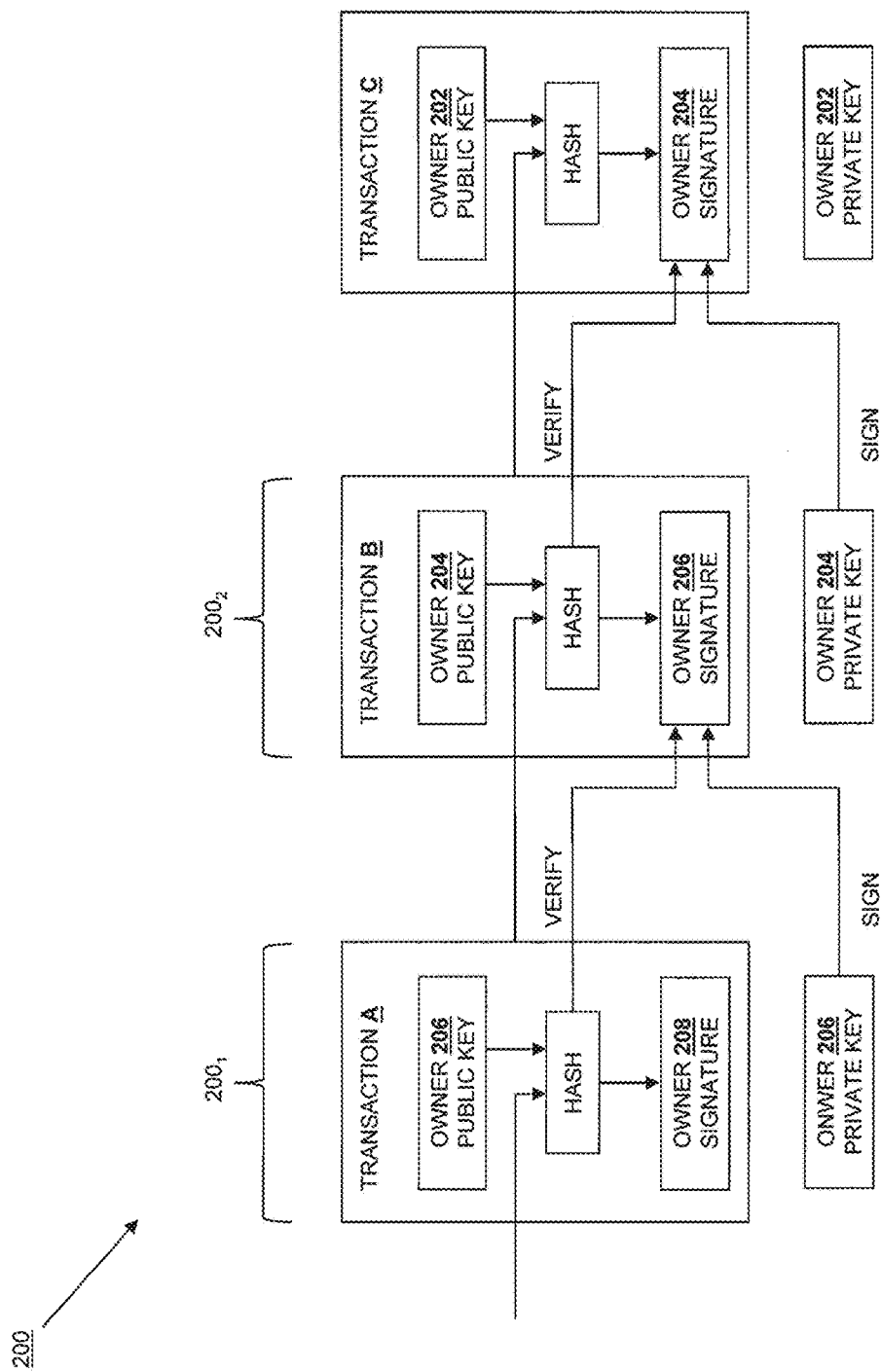
FIG. 2 is a schematic view illustrating an embodiment of an electronic coin or authentication token.

Referring now to FIG. 2, an embodiment of an electronic coin 200 is illustrated and described briefly for reference to the public ledger used in some embodiments of the method 100 discussed below. In those embodiments, a crypto currency system associated with the present disclosure defines an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of previous owners 204, 206, and 208. Specifically, in transaction A, a hash of the public key of owner 206 (i.e., the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) and added to an initial electronic coin (which was defined by digital signatures provided up to the transaction prior to transaction A) such that the electronic coin $200_1$ was transferred to owner 206.

Similarly, in transaction B, a hash of the public key of owner 204 (i.e., the owner receiving, as a result of transaction B, an electronic coin $200_2$ defined by digital signatures provided up to transaction B) and transaction A was signed by owner 206 and added to the electronic coin $200_1$ such that the electronic coin $200_2$ was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 and added to the electronic coin $200_2$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coins" is used to encompass any amount of electronic coins, and in the embodiments discussed below will typically be small fractions of a coin (e.g., 0.00000001 electronic coins) or some amount of a coin with relatively low value.

Figure 3:
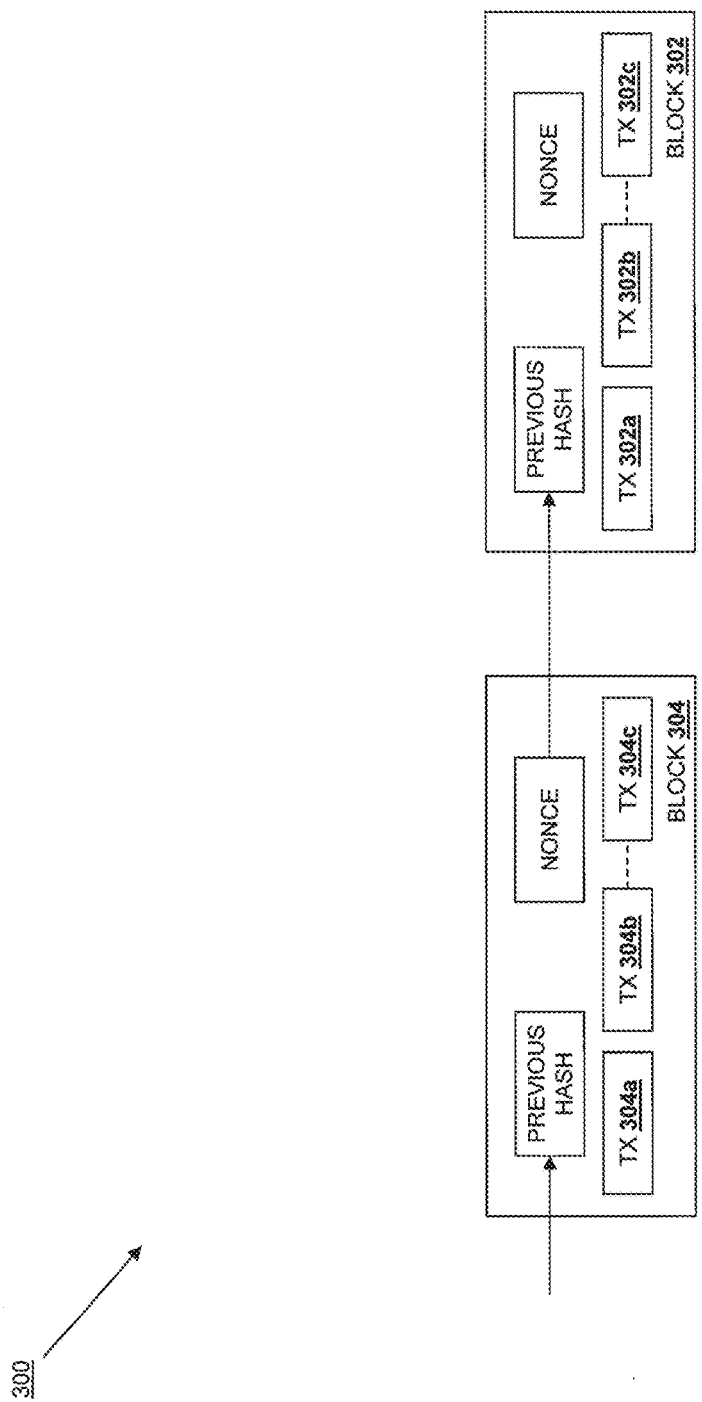
FIG. 3 is a schematic view illustrating an embodiment of a crypto currency public ledger or authentication public ledger.

Referring now to FIG. 3, an embodiment of a crypto currency public ledger 300 is illustrated and described briefly for reference to the public ledger used in some embodiments of the method 100 discussed below. Conventionally, the crypto currency public ledger 300 operates to verify that payers transferring an electronic coin (e.g., referring back to FIG. 2, owner 206 in transaction A, owner 204 in transaction B, and owner 202 in transaction C) did not "double-spend" (e.g., sign any previous transactions involving) that electronic coin. To produce the crypto currency public ledger 300, a distributed network of devices operates to agree on a single history of transactions in the order in which they were received such that it may be determined that a transaction between a payer and a payee using an electronic coin is the first transaction associated with that electronic coin. Each device in the distributed network operates to collect new transactions into a block, and then to increment a proof-of work system that includes determining a value that when hashed with the block provides a required number of zero bits.

For example, for a block 302 that includes a plurality of transactions 302a, 302b, and up to 302c, a device in the distributed network may increment a nonce in the block 302 until a value is found that gives a hash of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash of the accepted block 302). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device will switch to working on the branch of the chain that includes the second block).

Conventionally, the electronic coin(s) 200 and crypto currency public ledger 300 discussed above provide a distributed crypto currency system in which payers and payees may participate in transactions with each other using the electronic coins discussed above and without the need for a centralized authority such as a bank. Each of those transactions is recorded in the crypto currency public ledger to ensure that the electronic coins may only be spent by a payer once. It has been discovered that the electronic coin(s) 200 and crypto currency public ledger 300 may be utilized in an authentication process that is detailed below. However, while discussed mainly in terms of the electronic coin(s) 200 and crypto currency public ledger 300 detailed above, other embodiments of the present disclosure envision authentication tokens (which are substantially similar to the electronic coin 200 discussed above) and an authentication public ledger (which is substantially similar to the crypto currency public ledger 300 discussed above) that need not be associated with crypto currencies or the electronic "coins" discussed above. As such, as discussed below, the electronic coin 200 may be replaced by a substantially similar authentication token that may be used to perform authentication transactions on the authentication public ledger that do not necessarily involve the transfer of value between users.

Figure 4:
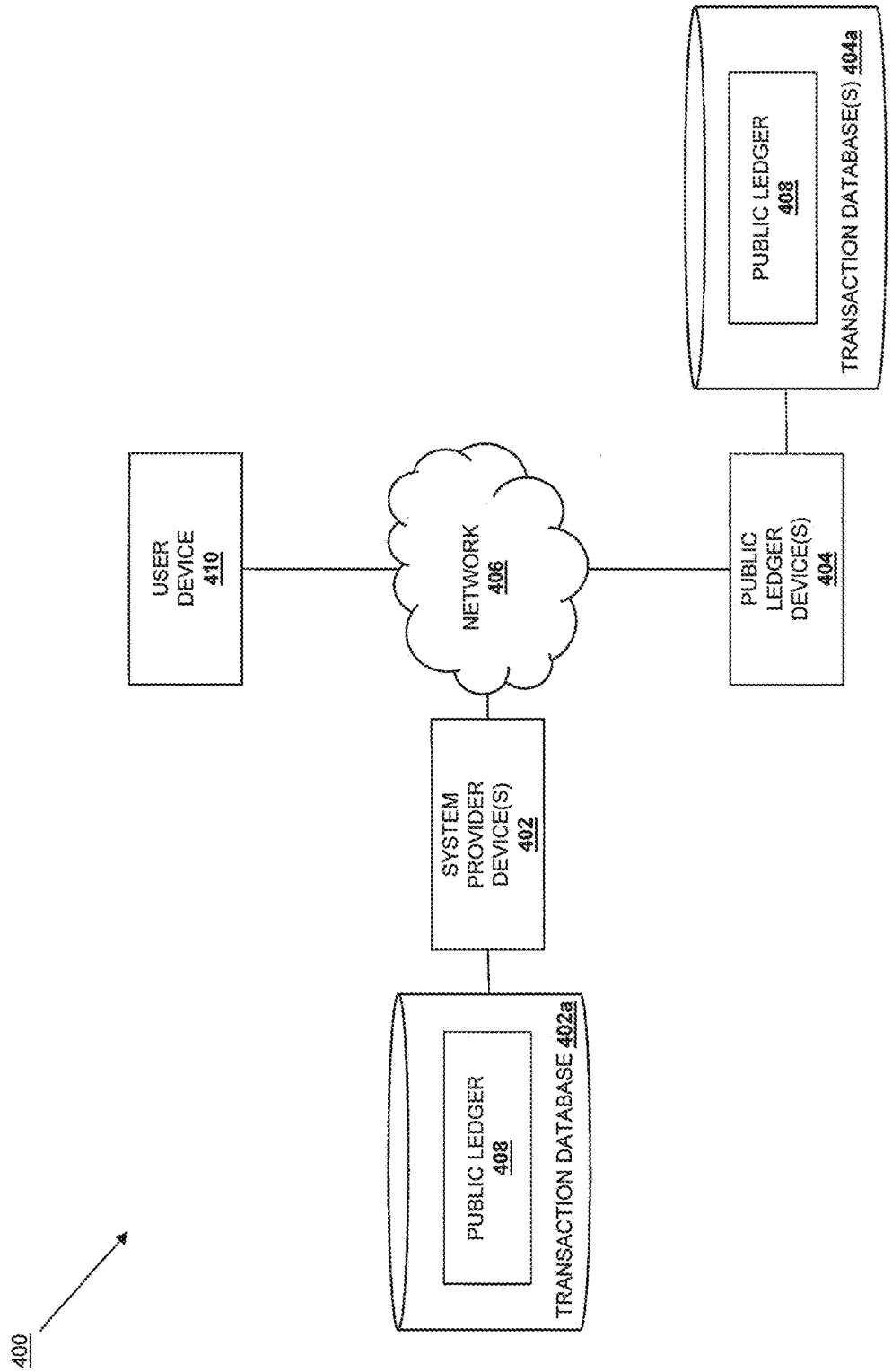
FIG. 4 is a schematic view illustrating an embodiment of a public ledger authentication system.

Referring now to FIG. 4, an embodiment of a public ledger authentication system 400 is illustrated and described briefly for reference in the method 100 discussed below. The public ledger authentication system 400 associated with the present disclosure may provide the public ledger discussed below as the crypto currency public ledger 300 discussed above in FIG. 3 that is part of a crypto currency system, as a dedicated authentication public ledger that need not necessarily be associated with a crypto currency system, or in other manners that would be apparent to one of skill in the art in possession of the present disclosure. For example, one or more system provider devices 402 and/or a public ledger devices 404 coupled together through a network 406 may operate to agree on a single history of transactions (e.g., crypto currency transactions, authentication transactions, etc.) in a public ledger 408 that may be stored on respective transaction databases 402a and 404a that are accessible by those system provider device(s) 402 and/or a public ledger device(s) 404 (e.g., each device may store its own copy of the public ledger). As discussed below, a user device 410 connected to the network 406 may then perform registration and authentication with the system provider device(s) 402.

In a specific example, for a block (e.g., similar to the blocks 302 and 304 discussed above with reference to FIG. 3) that includes a plurality of transactions (e.g., crypto currency transactions, authentication transactions, etc.), any of the system provider device(s) 402 and/or the public ledger device(s) 404 may increment a nonce in that block until a value is found that gives a hash of that block the required number of zero bits. The device may then "chain" that block to the previous block (which may have been "chained" to a previous block in the same manner). When the system provider device(s) 402 and/or the public ledger device(s) 404 find the proof-of-work for a block, that block may be broadcast to the distributed network (e.g., system provider device(s) 402 and/or the public ledger device(s) 404), and that block will be accepted if all the transactions in it are valid (which may be determined by creating the next block using the hash of the accepted block). The system provider device(s) 402 and/or the public ledger device(s) 404 will always consider the longest chain of blocks to be the correct one, and will operate to continue to extend it. If any of the system provider device(s) 402 and/or the public ledger device(s) 404 receives two different versions of a block, they will work on the first block received, but save the second block received in case the branch of the chain that includes the second block becomes longer (at which point that device will switch to working on the branch of the chain that includes the second block).

As such, in some embodiments, the registration transactions and authentication attempt transactions performed in the public ledger authentication system 400 as discussed herein may be recorded and published in the public ledger 408 as part of the crypto currency transactions performed in a distributed crypto currency system (e.g., a Bitcoin system), or in a substantially similar manner in a dedicated public ledger authentication system. As discussed above, in some examples of those embodiments, the creation and monitoring of the public ledger may be performed by a distributed network of computing systems operating to provide a crypto currency system or a dedicated public ledger authentication system. In other embodiments, the creation and monitoring of the public ledger 408 may be performed by a central authority such as the system provider discussed below. As such, the transactions recorded in the public ledger 408 may not be created and monitored like a distributed crypto currency, but rather may be recorded and tracked by the system provider device(s) 402 without necessarily including the public keys, signatures, and/or private keys utilized in tracking the transactions in a distributed crypto currency system. As such, a wide variety of variation in the manner in which transactions are reported, recorded, and published in the public ledger 408 of the public ledger authentication system 400 are envisioned as falling within the scope of the present disclosure.

Figure 5:
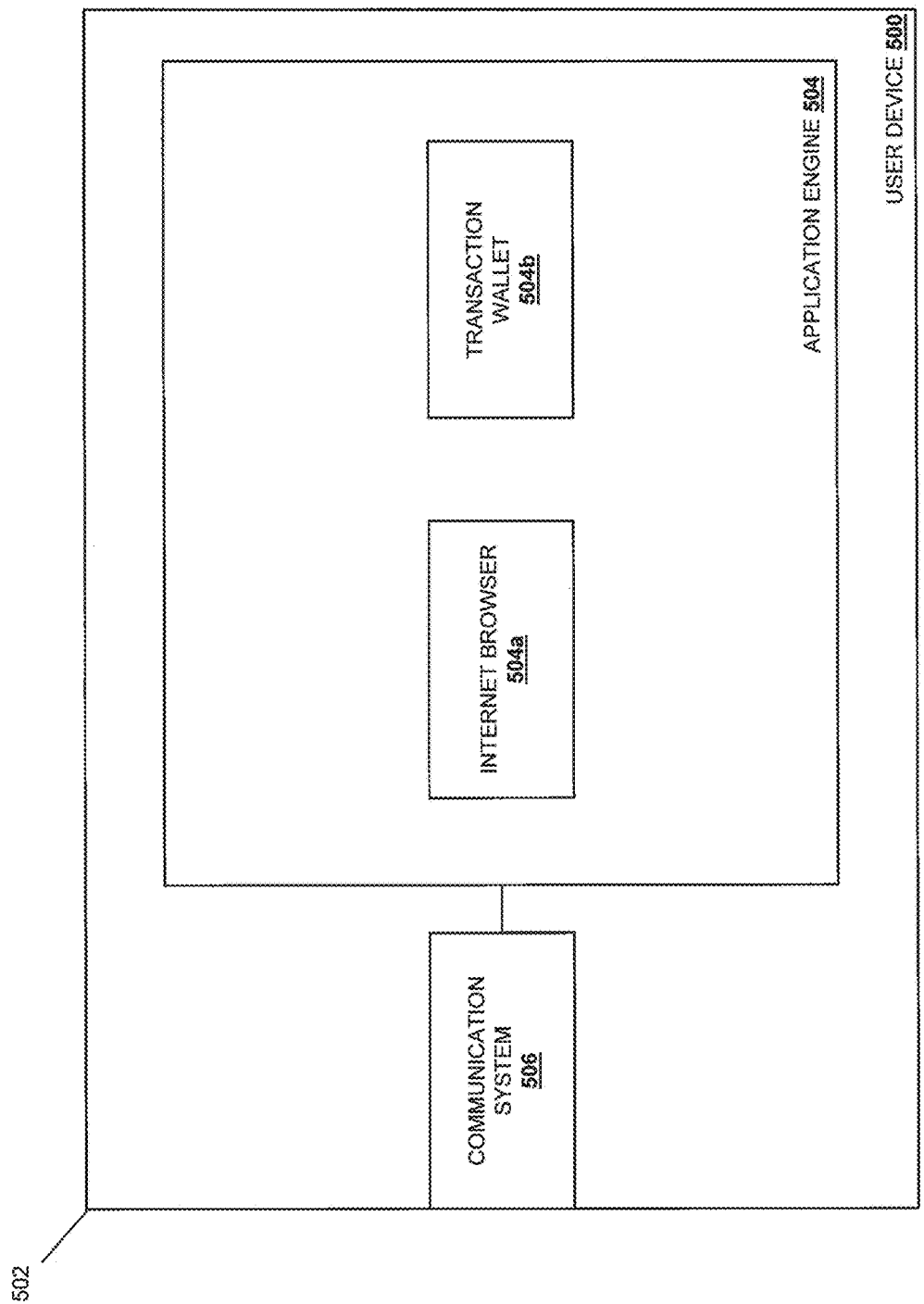
FIG. 5 is a schematic view illustrating an embodiment of a user device used in the public ledger authentication system of FIG. 4.

Referring now to FIG. 5, an embodiment of a user device 500 is illustrated that may be the user device 410 discussed above, and which may be provided by a desktop computing system, a laptop/notebook computing system, a tablet computing system, a mobile phone, and/or other user devices known in the art. In the illustrated embodiment, the user device 500 includes a chassis 502 that houses the components of the user device 500, only some of which are illustrated in FIG. 5. For example, the chassis 502 may house a processing system (not illustrated) and a non-transitory memory system (not illustrated) that includes instructions that, when executed by the processing system, cause the processing system to provide an application engine 504 for is configured to perform the functions of the applications and user devices discussed below. In a specific example, the application engine 504 is configured to provide an internet browser application 504a and the transaction wallet application 504b discussed below, although one of skill in the art in possession of the present disclosure will recognize that other applications and computing device functionality may be enabled by the application engine 504 as well. The chassis 502 may also house a communication system 506 that is coupled to the application engine 504 (e.g., via a coupling between the communication system 506 and the processing system) and configured to provide for communication through the network 406 as detailed below.

In some embodiments, the system provider device(s) 402 may provide the transaction wallet application 504b through the network to the user device 500 prior to or during the method 100 (e.g., in order to perform the registration sub-method 100A). However, in other embodiments, the transaction wallet application 504b may be provided on the user device 500 by the user separately from the method 100. For example, the transaction wallet application 504b may be utilized with a crypto currency system as discussed above to perform crypto currency transactions. As such, the transaction wallet application 504b may be a dedicated authentication transaction wallet application, a crypto currency transaction wallet application that has be "repurposed" for use in public ledger authentication, or other public ledger wallets known in the art.

Referring now to FIG. 1A, the registration sub-method 100A begins at block 102 where a system provider device receives and stores user identification information from a user device. In some embodiments, the registration sub-method 100A may be performed by a user of the user device 410 upon initial registration with the system provided by the system provider device(s) 402 (or utilizing the public ledger authentication system provided by the system provider device(s) 402). However, in other embodiments, the registration sub-method 100A may be performed by a user of the user device 410 that has previously registered with the system provided by the system provider devices 402 (or utilizing the public ledger authentication system provided by the system provider device(s) 402) in order to subsequently authenticate with that system. At block 102, the user device 410 may provide the system provider device(s) 402 a variety of user identification information such as, for example, a name of the user, an address of the user, a phone number of the user, a date of birth of the user, a social security number of the user, and/or any other identifier that may be utilized to identify the user. For example, the user identification information may be received via a secure data transfer using a user identification information web page provided by the system provider device(s) 402 through the network 406 to the user device 410. However, in another example, the user identification information may have been previously collected from the user device 410 or via other means by the system provider device(s) 402. At block 102, the system provider device(s) 402 may store that user identification information in one or more databases that are accessible to the system provider device(s) 402.

The method 100A may then proceed to block 104 where the system provider device generates a first user static key using the user identification information, and stores the first user static key. In an embodiment, at block 104 the system provider device(s) 402 may use a hash function to perform a hash operation on the user identification information received from the user and stored at block 102 in order to generate a first user static key, and store that first user static key in one or more databases that are accessible to the system provider device(s) 402. As discussed below, the hash operation may be performed by the system provider device(s) 402 using the hash function that is shared with the user device 410 so that the user may generate a second static user key using their user identification information that is identical to the first user static key if that user is an authorized user that both 1) knows the user identification information, and 2) has received the correct hash function from the system provider. For example, the system provider device(s) 402 may provide or identify the hash function to the user device 410/500 through the network 406, and the user device 410/500 may store that hash function (or the identity/location of that hash function) in the transaction wallet application 504b.

The registration sub-method 100A then proceeds to block 105 where the system provider device sends a first registration public ledger address to the user device. In an embodiment, at block 105 the system provider device(s) 402 may send a first registration public ledger address through the network 406 to the user device 410. For example, at block 105, the system provider device(s) 402 may identify a "to" address in the public ledger 408 (i.e., an address in the public ledger 300 that is controlled by the system provider device(s) 402) as a first registration public ledger address, and send that first registration public ledger address through the network 406 to the user device 410. In an embodiment, the transmission of the first registration public ledger address may be performed via a secure data transfer. For example, the transmission of the first registration public ledger address may be performed by the system provider device(s) 402 over a secure data channel, the system provider device(s) 402 may encrypt the first registration public ledger address before its transmission, and/or a variety of other secure data transfer methods may be performed at block 105 to ensure that the first registration public ledger address cannot be intercepted in a manner that discloses that first registration public ledger address to entities other than the user.

The registration sub-method 100A then proceeds to block 106 where the system provider device receives a second registration public ledger address from the user device. In an embodiment, at block 106 the user device 410 may send a second registration public ledger address through the network 406 to the system provider device(s) 402. For example, at block 106, the transaction wallet application 504b in the user device 410/500 may identify a "from" address in the public ledger 408 (i.e., an address in the public ledger 300 that is associated with electronic coin(s) 200 and/or authentication tokens that are controlled by the transaction wallet application 504b) as a second registration public ledger address, and send that second registration public ledger address through the network 406 to the system provider device(s) 402. In an embodiment, the transmission of the second registration public ledger address may be performed via a secure data transfer. For example, the transmission of the second registration public ledger address may be performed by the transaction wallet application 504b over a secure data channel, the transaction wallet application 504b may encrypt the second registration public ledger address before its transmission, and/or a variety of other secure data transfer methods may be performed at block 106 to ensure that the second registration public ledger address cannot be intercepted in a manner that discloses that second registration public ledger address to entities other than the system provider.

The registration sub-method 100A then proceeds to block 108 where the system provider device retrieves a second user static key sent to the first registration public ledger address from the second registration public ledger address in a transaction in the public ledger. In an embodiment, following block 106, the user device 410 may generate the second static user key using the hash function (received or identified by the system provider device(s) 402) and the user identification information discussed above. The user device 410 may then send that second static user key to the first registration public ledger address from the second registration public ledger address in a transaction in the public ledger 408. For example, the transaction wallet application 504b in the user device 410/500 may generate the second user static key as discussed above and include it in a metadata field of a transaction in the public ledger 408 that is sent to the first registration public ledger address from the second registration public ledger address. In some embodiments, the transaction at block 108 may be a crypto currency transaction that sends an amount of crypto currency (e.g., 1 satoshi in a Bitcoin transaction that is worth fractions of cent) to the first registration public ledger address from the second registration public ledger address, and that includes the second static user key in metadata provided with the transaction. In other embodiments, the transaction at block 108 may send an authentication token to the first registration public ledger address from the second registration public ledger address, and that includes the second static user key in metadata provided with the transaction.

At block 108, the system provider device(s) 402 may retrieve the second user static key sent to the first registration public ledger address from the second registration public address in the transaction in the public ledger 408 by accessing the public ledger 408 and using the first and second registration public ledger addresses to identify the transaction that includes the second static user key in its metadata, and then retrieving the second static user key from that transaction. In the event that no static user key is included in the transaction sent to the first registration public ledger address from the second registration public ledger address, the registration sub-method 100A may end and the user may not be registered with the system. As such, the secure data transfer of the first and second registration public ledger addresses between the user device 410 and the system provider device(s) 402 ensures the system provider device(s) 402 that a subsequent static user key retrieved in a transaction to the first registration public ledger and address and from the second registration public ledger address was provided by the user.

The registration sub-method 100A then proceeds to block 110 where the system provider device verifies the second static user key using the first static user key to provide a verified static user key in the public ledger. In an embodiment, the system provider device(s) 402 may compare the second static user key that was retrieved from the public ledger 408 at block 108 with the first static user key that was generated by the system provider device(s) 402 and stored at block 104 to determine whether they match. In the event the second static user key retrieved from the public ledger 408 at block 108 does not match the first static user key generated and stored at block 104, the registration sub-method 100A may end and the user may not be registered with the system. However, if the second static user key retrieved from the public ledger 408 at block 108 matches the first static user key generated and stored at block 104, the second static user key that is included in the transaction in the public ledger 408 becomes a verified static user key, and the user is now "registered" with the system and the user may be subsequently authenticated using the system as described in detail with reference to the authentication sub-method 100B discussed below.

The registration sub-method 100A then proceeds to block 112 where the system provider device(s) 402 discard the user identification information and the first user static key. In an embodiment, at block 112 the system provider device(s) 402 may erase, overwrite, or otherwise discard the user identification information and the first static user key that were stored in the at least one database at blocks 102 and 104. As will be appreciated by one of skill in the art in possession of the present disclosure, following verification of the second static user key in the public ledger 408 to provide the verified static user key, the storage of the user identification information received at block 102 or the first static user key generated at block 104 is unnecessary as the system provider may perform the actions discussed below with regard to the authentication sub-method 100B to authenticate the user simply using the verified static user key included in the transaction in the public ledger 408. Thus, user identification information such as Personally Identifiable Information (PII) does not need to be stored by the system provider device(s) 402, and may only reside with the user (e.g., memorized by the user, stored in the transaction wallet application 504b, etc.)

Figure 1B:
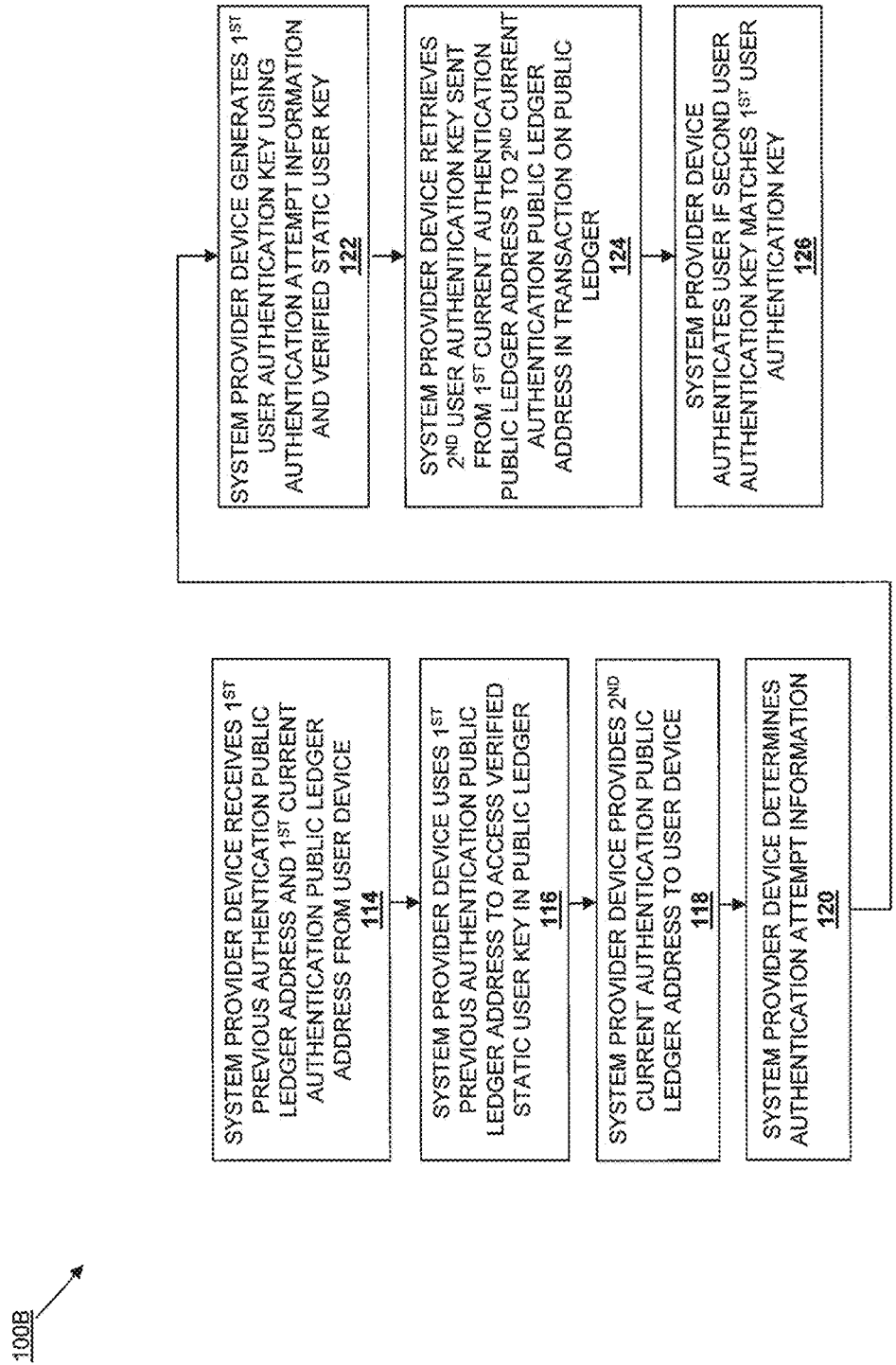
FIG. 1B is a flow chart illustrating an embodiment of a authentication method for authenticating using a public ledger.
Figure 6:
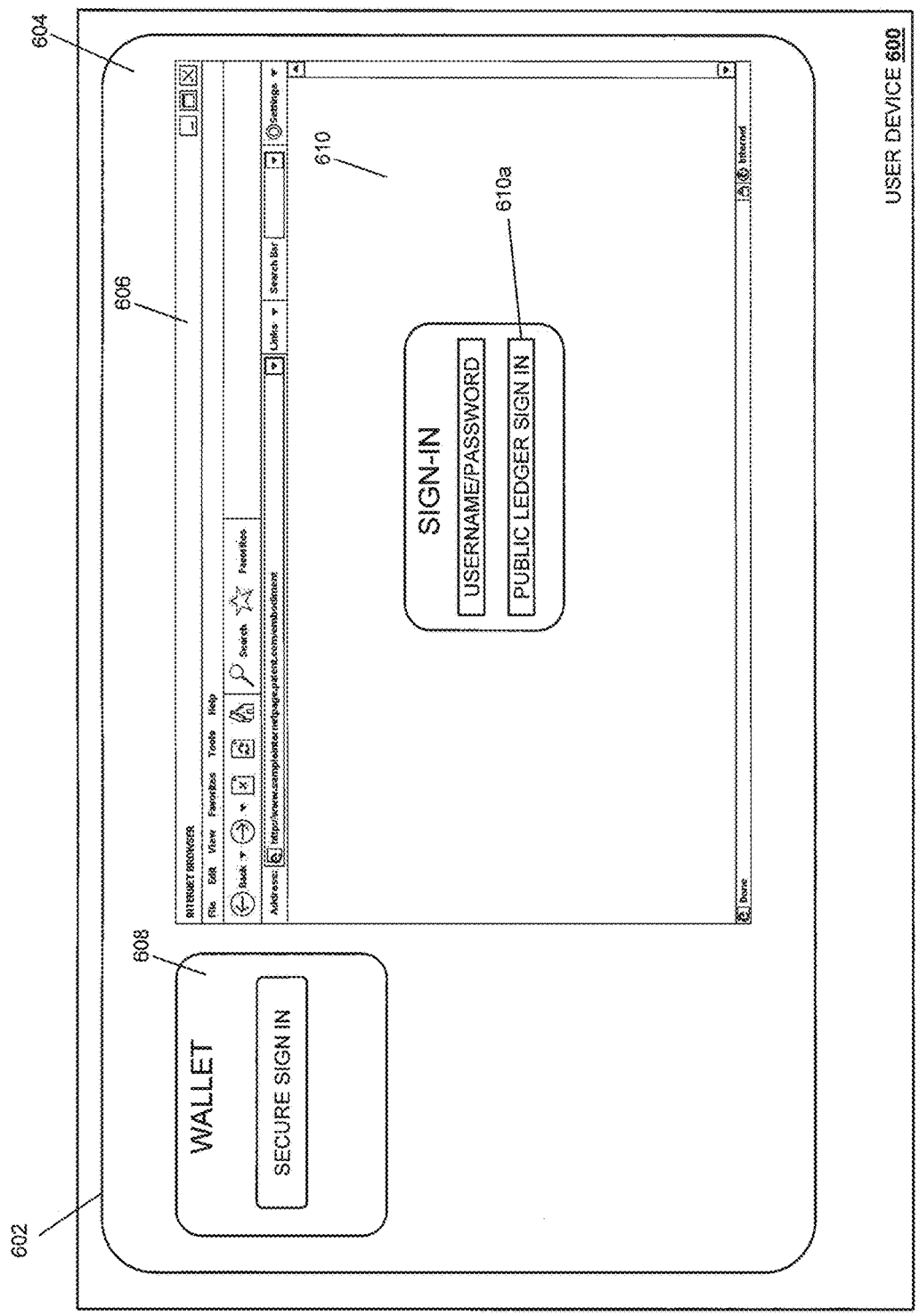
FIG. 6 is a screen shot of an embodiment of a user device displaying an authentication screen.

Referring now to FIGS. 1B and 6, the method 100 may then proceed to the authentication sub-method 100B. FIG. 6 illustrates a user device 600, which may be the user devices 410 and/or 500 discussed above, including a display device 602 displaying an embodiment of an authentication screen 604. In the illustrated embodiment, the authentication screen 604 includes an Internet browser 606 (e.g., provided by the Internet browser application 504a discussed above with reference to FIG. 5) and a transaction wallet 608 (e.g., provided by the transaction wallet application 504b discussed above with reference to FIG. 5). For example, the user may access an authentication web page 610 that is provided on the Internet browser 606 and that includes a public ledger sign-in option 610a that the user has previously registered for. In response to the user selecting the public ledger sign-in option 610a, the transaction wallet 608 may automatically launch such that it is provided on the authentication screen 604 adjacent the Internet browser 606. However, in other embodiments, the actions performed according to the authentication sub-method 100B discussed below may be performed without activation or launching of the Internet browser 606 and/or the transaction wallet 608. For example, in response to loading the authentication page 610 on the Internet browser, the transaction wallet 608 may operate in the background (e.g., without launching) to perform the actions discussed with reference to the authentication sub-method 100B below. In another example, authentication may occur for a system that is not displayed in an Internet browser, and thus may occur entirely in the background (e.g., without launching the Internet browser 606 or the transaction wallet 608) to perform the actions discussed with reference to the authentication sub-method 100B below. As such, a wide variety of authentication scenarios other than those illustrated will benefit from the teachings of the present disclosure and thus are envisioned as falling within its scope.

The authentication sub-method 100B begins at block 114 where the system provider device receives a first previous authentication public ledger address and a first current authentication public ledger address from the user device. In an embodiment, at block 114 the transaction wallet application 504*b* in the user device 410/500 may retrieve a first previous authentication public ledger address that may be the "from" address that was used in a previous authentication attempt with the public ledger authentication system 400. For example, the first previous authentication public ledger address may be the "from" address utilized by the user to perform the most recent authentication with the public ledger authentication system 400 (e.g., the most recent performance of the authentication sub-method 100B prior to the current performance of the authentication sub-method 100B). In an embodiment, at block 114, the transaction wallet application 504*b* in the user device 410/500 may also identify a "from" address in the public ledger 408 (i.e., an address in the public ledger 300 that is associated with electronic coin(s) 200 and/or authentication tokens that are controlled by the transaction wallet application 504*b*) as a first current public ledger address that will be used in the authentication attempt discussed in further detail below according to the authentication sub-method 100B.

At block 114, the user device 410/500 may send the first previous authentication public ledger address and the first current authentication public ledger address through the network 406 to the system provider device(s) 402. In an embodiment, the transmission of the first previous authentication public ledger address and the first current authentication public ledger address may be performed via a secure data transfer. For example, the transmission of first previous authentication public ledger address and the first current authentication public ledger address may be performed by the transaction wallet application 504*b* over a secure data channel, the transaction wallet application 504*b* may encrypt the first previous authentication public ledger address and the first current authentication public ledger address before transmission, and/or a variety of other secure data transfer methods may be performed at block 114 to ensure that the first previous authentication public ledger address and the first current authentication public ledger address cannot be intercepted in a manner that discloses first previous authentication public ledger address and the first current authentication public ledger address to entities other than the system provider.

The authentication sub-method 100B then proceeds to block 116 where the system provider device uses the first previous authentication public ledger address to access the verified static user key in the public ledger. In an embodiment, the system provider device(s) 402 may utilize the first previous authentication public ledger address to identify at least one other previous authentication public ledger address, and use that other previous authentication public ledger address to identify the verified static user key in the public ledger 408. For example, the system provider device(s) 402 may include a database that associates each user (including the use of the user device 408) with all of the "from" public ledger addresses that have been utilized by that user in previous authentication attempts with the public ledger authentication system 400. As such, at block 116, the system provider device(s) 402 may access that database and use the first previous authentication public ledger address to determine the user that previously used that first previous authentication public ledger address in a previous authentication attempt, and then reference the other previous authentication attempt public ledger addresses (including the registration public ledger address) to access the transaction in the public ledger that was performed during the registration method 100A and that includes the verified static user key.

Furthermore, the system provider device(s) 402 may store all the previous "to" addresses used in previous authentication transactions by the user. For example, each previous "to" address may be associated in a database with its corresponding "from" address for each of the previous authentication transactions performed to authenticate the user, and at block 116 the system provider device(s) 402 may use the "to" and "from" address pairs to access the verified static user key in the public ledger. As such, the system provider device(s) may provide the user device with a different "to" address for each authentication transaction so that each authentication transaction is associated with different "to" and "from" address pairs.

The authentication sub-method 100B then proceeds to block 118 where the system provider device provides a second current authentication public ledger address to the user device. In an embodiment, at block 118, the system provider device(s) 402 may identify a "to" address in the public ledger 408 (i.e., an address in the public ledger 300 that is associated with electronic coin(s) 200 and/or authentication tokens that are controlled by the system provider device(s) 402) as a second current public ledger address that will be used in the authentication attempt discussed in further detail below, and send that second current authentication public ledger address through the network 406 to the user device 410. In an embodiment, the transmission of the second current authentication public ledger address may be performed via a secure data transfer. For example, the transmission of the second current authentication public ledger address may be performed by the system provider device(s) 402 over a secure data channel, the system provider device(s) 402 may encrypt the second current public ledger address before transmission, and/or a variety of other secure data transfer methods may be performed at block 118 to ensure that the second current authentication public ledger address cannot be intercepted in a manner that discloses second current authentication public ledger address to entities other than the user.

The authentication sub-method 100B then proceeds to block 120 where the system provider device determines authentication attempt information. In an embodiment, at block 120 the system provider device(s) 402 determines authentication attempt information that may include, for example, a number of previous authentication attempts by the user. For example, using the first previous authentication public ledger address and the database of other previous authentication public ledger addresses used by the user in previous authentication attempts, the system provider device(s) may determine a count of the number of previous authentication attempts by the user. In addition, in some embodiments the authentication attempt information may include a date and time for the current authentication attempt. For example, the system provider device(s) 402 and the transaction wallet application 504*b* in the user device 500 may synchronize a date and time between each other, and at block 120 the system provider device(s) may identify a date and time for the current authentication attempt by the user.

The authentication sub-method 100B then proceeds to block 122 where the system provider device generates a first user authentication key using the authentication attempt information and the verified static user key. In an embodiment, at block 122 the system provider device(s) 402 may use a hash function to generate a first user authentication key by performing a hash operation on the authentication attempt information. For example, the system provider device(s) 402 may utilize a hash function (which may be shared with the user device 410 similarly as discussed above for the hash function used in the registration method 100A) with the verified static user key that was accessed at block 116, along with the number of previously authentication attempts by the user, to generate the first user authentication key. In some specific examples, the hash operation may be performed on the verified static user key, the number of previous authentication attempts by the user, the date and time for the current authentication attempt, and/or other information available to the system provider device(s).

The authentication sub-method 100B then proceeds to block 124 where the system provider device retrieves a second user authentication key sent from the first current authentication public ledger address to the second current authentication public ledger address in a transaction in the public ledger. In an embodiment, at block 124 the user device may generate a second user authentication key using the same hash function that was utilized by the system provider device at block 122 to generate the first user authentication key, and send that second user authentication key from the first current authentication public ledger address (provided to the system provider device(s) 402 at block 114) to the second current authentication public ledger address (received from the system provider device(s) 402 at block 118) in a transaction on the public ledger 408. As such, at block 124 the transaction wallet application 504b in the user device 410/500 may perform the same hash operation as was performed by the system provider device at block 122 on the verified static user key (which may be stored in the transaction wallet application 504b or accessible by the user device 410 on the public ledger 408), the number of previous access attempts by the user (which may be stored in or accessible by the transaction wallet application 504b), and in some examples the date and time of the current authentication attempt (which is synchronized with the system provider device(s)) to generate the second user authentication key. As such, in some embodiments, the user device 410 may only need to store the "from" address used in the most recent authentication attempt along with a count of the number of authentication attempts to the public ledger authentication system 400 in order to authenticate to a secure system.

The transaction wallet application 504b may then provide the second user authentication key as metadata in a transaction that is sent from the first current authentication public ledger address to the second current authentication public ledger address in a transaction on the public ledger 408. As such, at block 124, the system provider device(s) 402 may access that transaction on the public ledger 408 (i.e., by referencing the first current authentication public ledger address and/or the second current authentication public ledger address, both of which are known to the system provider device(s) 402) and retrieve the second user authentication key.

The authentication sub-method 100B then proceeds to block 126 where the system provider device authenticates the user if the second user authentication key matches the first user authentication key. In an embodiment, if the system provider device(s) 402 determine that the second user authentication key retrieved at block 124 matches the first user authentication key generated at block 122, the system provider device(s) 402 authenticate the user and allow the user to access the secure system protected by the public ledger authentication system 400. However, if the system provider device(s) 402 determine that the second user authentication key retrieved at block 124 does not match the first user authentication key generated at block 122, the system provider device(s) does not authenticate the user and the user is not allowed to access to the secure system protected by the public ledger authentication system 400.

Thus, systems and methods have been described that provide for the authentication of a user to the system via a public ledger. The public ledger authentication systems and methods provide for registration and authentication of users using a public ledger in a manner that eliminates the need for the system provider to store user identification information about the user, while only requiring the user to store a previous "from" address used in an authentication attempt, along with the number of authentication attempts that have been made to the system. As such, the public ledger authentication system provides a secure authentication system where the protection of the number of authentication attempts and the addresses used in those authentication attempts prevents unauthorized authentication to the system.

The public ledger authentication system discussed above provides the ability to utilize public ledgers to enable a wide variety of functionality. As discussed below, the authentication discussed above may be used to perform methods that provide for the matching of payers with payees based on their transactions that are made via a public ledger, the tracking of on-platform and off-platform loans using a public ledger, the provisioning of credit endorsement via multi-signature transactions on a public ledger, the updating of transaction activity and monitoring of the status of a transaction via a public ledger, and the use of transaction histories stored on a public ledger to quantify risk, offer transaction insurance, and/or on-board a user to the platform.

Figure 7:
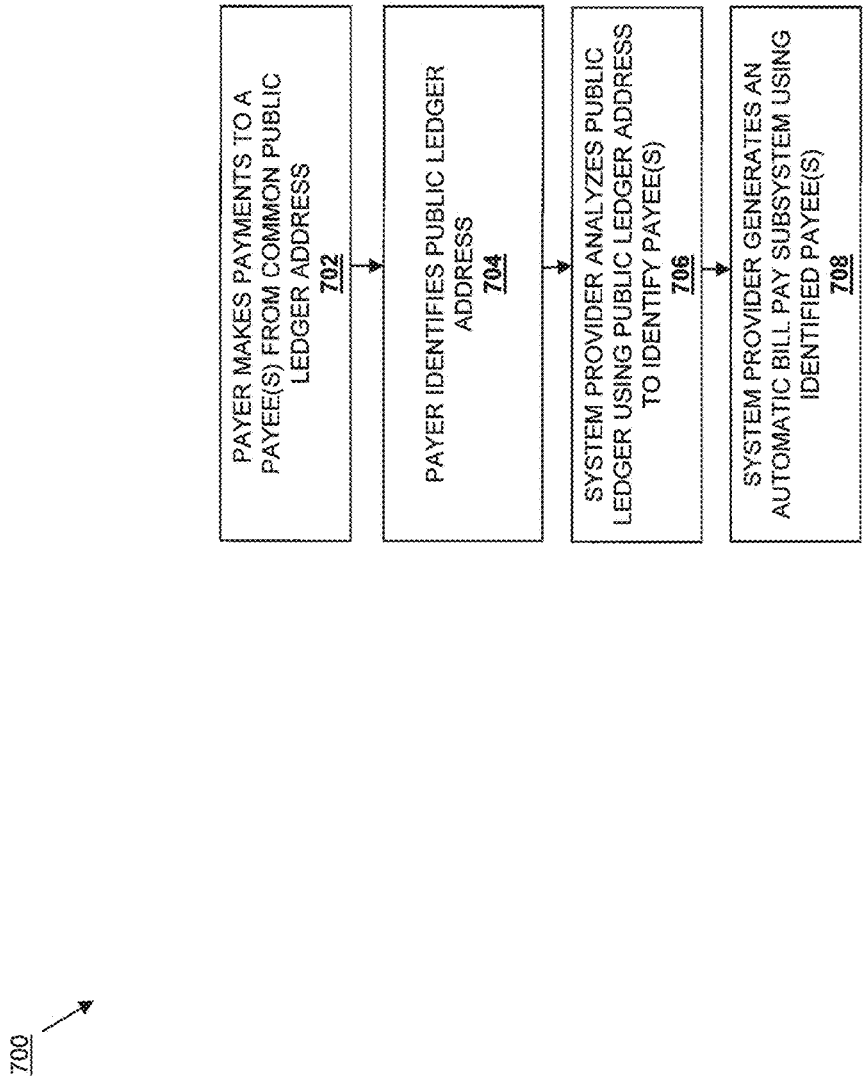
FIG. 7 is a schematic view illustrating an embodiment of a networked system.

Referring now to FIG. 7, an embodiment of a method 700 for matching payers with payees via a public ledger is illustrated. As discussed below, the method 700 allows a payer to make payments to one or more payees via a common public ledger address, provide that public ledger address to a system provider, and have the system provider use that common public ledger address to identify the one or more payees to whom the payer has made payments, and generate automatic bill payments from the payer to the payee(s) for future payments. In at least some embodiments, the method 700 may benefit from the public ledger authentication methods discussed above by, for example, verifying the identity of the payer or verifying the identify of any of the payees. However, in other embodiments, the method 700 may operate without the need to perform the public ledger authentication methods discussed above, or using conventional authentication methods that would be apparent to one of skill in the art in possession of the present disclosure.

The method 700 begins at block 702 where a payer makes payments to payee(s) from a common public ledger address. In an embodiment, each time the payer makes a payment to payee, the payer may transfer electronic coins using the transaction wallet 504b in the user device 500 as discussed above to sign a transaction that transfers the electronic coins (in the amount owed to the payee) from a particular public ledger address controlled by the transaction wallet 504a (i.e., for which the transaction wallet holds the private keys) to a public ledger address controlled by that payee. In some examples, the transaction wallet 504 may operate (e.g., at the instruction of the payer, automatically, etc.) to ensure that the particular public ledger address controlled by the transaction wallet 504a and from which payments are made to payee(s) is funded by periodically transferring electronic coins from other public ledger addresses controlled by the transaction wallet 504b to that particular public ledger address. As such, that particular public ledger address may remain funded with a sufficient number of electronic coins to cover any payments made to payee(s) during any number of performances of the method 700. Thus, the performance of block 702 of the method 700 will typically result in multiple different payees being sent electronic coins from a particular public ledger address controlled by the transaction wallet 504b of the payer.

The method 700 then proceeds to block 704 where the payer identifies the public ledger address that was used at block 702 to make the payments to the payee(s). In an embodiment, at block 704, the payer may identify the public ledger address using the transaction wallet 504b. In some examples, identification of the public ledger address to the transaction wallet may occur via an explicit identification of the public ledger address that was used at block 702 to make the payments to the payee(s). In other example, the use of the public ledger address at block 702 to make the payments to the payee(s) may result in an implicit identification of the public ledger address at block 704 as a result of the transaction wallet 504b recognizing the repeated use of that particular public ledger address. As discussed below, in some embodiments, the transaction wallet 504b may operate as the "system provider" to perform blocks 706 and 708 and, as such, identification of the public ledger address at block 704 to (or by) the transaction wallet 504b may complete block 704 of the method 700. However, in other embodiments, the "system provider" may be a payment service provider such as, for example, PayPal Inc. of San Jose, Calif. (or another network connected entity), and the payer and/or transaction wallet 504b may identify the public ledger address at block 704 by identifying the public ledger address over the network to the system provider. While a few examples have been provided, one of skill in the art in possession of the present disclosure will recognize that the public ledger address may be identified in a variety of manners that will fall within the scope of the present disclosure.

The method 700 then proceeds to block 706 where the system provider analyzes the public ledger using the public ledger address to identify payee(s). As discussed above, in some embodiments, the transaction wallet 504b of the payer may operate as the system provider to perform block 706 to analyze the public ledger, while in other embodiments a network connected entity such as a payment service provider may operate as the system provider to perform block 706 to analyze the public ledger. In an embodiment, using the public ledger address identified at block 704, the system provider may access the public ledger 408, identify payments (e.g., electronic coin transfers) sent from the public ledger address at block 702, and retrieve the details of those payments. For example, for each payment made from the public ledger address at block 702, the system provider may retrieve details such as the payment amount of that payment (e.g., the amount of electronic coins sent), the public ledger address to which that payment was sent (e.g., the public ledger address controlled by the payee), the time of the payment, and/or any other details that may be associated with that payment that would be apparent to one of skill in the art in possession of the present disclosure. At block 706, any or all of the details of a particular payment may be associated with the public ledger address to which that payment was sent, and that public ledger address may be associated with the payee to which that payment was sent using the techniques discussed below.

In some embodiments, the system provider may identify payee(s) via the public ledger address(es) to which payments were sent at block 702 by matching those public ledger address(es) to payee identifiers in a database. For example, payees may identify the public ledger address(es) at which they receive payments, and those identifications may be associated with those payees in a database that is accessible to the system provider. Thus, at block 706, the system provider may identify payees by matching the public ledger address(es) to which payments were sent at block 702 to payee(s) in the database. In another embodiment, the transaction wallet 504b may request the identification of a payee (i.e., by the payer) when more than one payment is sent to a particular public ledger address. In yet another embodiment, the identification of the payee may be the identification of the public ledger address to which a payment was sent at block 702 (i.e., a public ledger address controller by a payee may be considered the identification of a payee).

The method 700 then proceeds to block 708 where the system provider generates an automatic bill pay subsystem using the identified payee(s). In an embodiment, at block 708, the system provider generates an automatic bill pay subsystem using the payee(s) identified at block 706. In examples in which the transaction wallet 504b is the system provider, the transaction wallet 504b may generate an automatic bill pay subsystem and add one or more of the payee(s) identified at block 706 to the automatic bill pay subsystem. In examples in which a network connected entity such as a payment service provider is the system provider, the system provider may identify the one or more of the payee(s) to the transaction wallet 504b for adding to its automatic bill pay subsystem. As such, payee identifiers, public ledger addresses associated with payees, payment amounts, and/or other payment details may be added to a reoccurring electronic coin transaction that is provided by the transaction wallet 504b In a specific example, the generation of the automatic bill pay subsystem at block 708 may be performed only after a minimum number of payments have been made to a payee/public ledger address associated with a payee. In another specific example, the payer may be required to confirm the addition of a payee to the automatic bill pay subsystem provided by the transaction wallet 504b. Similarly, payment amounts to a particular payee may be determined based on past payment amounts (e.g., an average of the previous payments made to the payee), and may require confirmation by the payer as well. In some embodiments, the addition of a payee to the automatic bill pay subsystem provided by the transaction wallet 504b may include subsequent connections to the payee (e.g., at times identified by the previous payments such as the first week of every month).

Thus, a method for matching payers with payees via a public ledger has been described that allows a payer to make payments to one or more payees via a common public ledger address, provide that public ledger address to a system provider, have the system provider use that common public ledger address to identify the one or more payees to whom the payer has made payments, and generate automatic bill payments from the payer to the payee for future payments. The authentication of the payer via the public ledger authentication system discussed above, may be beneficial in confirming the identity of the payer making the payments to the payees, but is not necessary in all embodiments. Furthermore, while the identification of payees to which a payer has made payments from a common public ledger address has been described below, one of skill in the art in possession of the present disclosure will recognize how the method 700 may be modified to identify payers who make payments to a payee by analyzing the public ledger using payee address(es) at which a payee receives payments (e.g., payers may be identified via public ledger addresses from which those payers send payments to one or more public ledger addresses controlled and identified by the payee).

Figure 8:
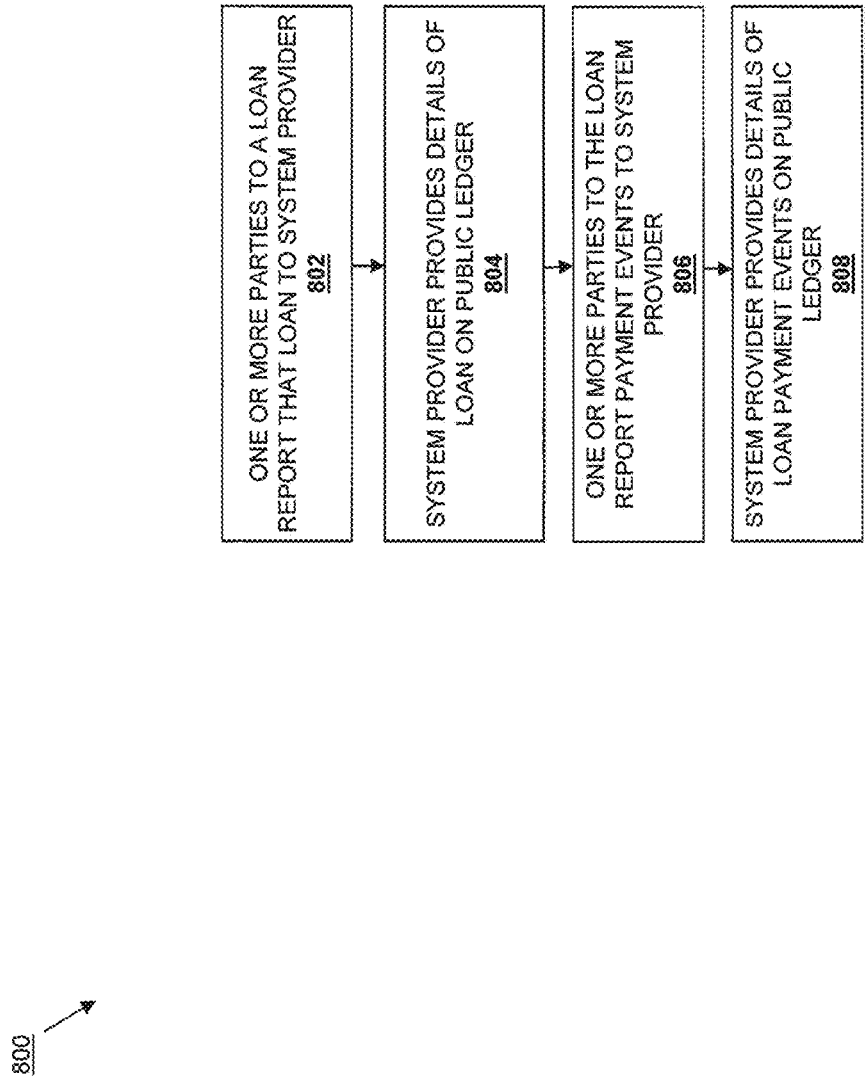
FIG. 8 is a perspective view illustrating an embodiment of a user device.

Referring now to FIG. 8, an embodiment of a method 800 for tracking on and off platform loans is illustrated. As discussed below, the method 800 allows parties to report loans to a system provider to have the details of those loans posted to a public ledger. Subsequently, parties to the loan can report payment events to the system provider to have the details of those payment events posted to the public ledger. As such, peer-to-peer and other loans may be tracked via a public ledger. In at least some embodiments, the method 800 may benefit from the public ledger authentication methods discussed above by, for example, verifying the identity of the parties to the loan. However, in other embodiments, the method 800 may operate without the need to perform the public ledger authentication methods discussed above, or using conventional authentication methods that would be apparent to one of skill in the art in possession of the present disclosure.

The method 800 begins at block 802 where one or more parties to a loan report that loan to a system provider. In an embodiment, the system provider may be a payment service provider such as PayPal, Inc. of San Jose, Calif. However, in other embodiments, the system provider may be a bank or other financial institution known in the art. At block 802, the system provider receives details of a loan from one or more parties involved in that loan. For example, two parties may be involved in a peer-to-peer loan where a first party loans money to a second party without the use of a third party loan service provider. While the method 800 is discussed below as involving a peer-to-peer loan, one of skill in the art in possession of the present disclosure will recognize that other types of loans will benefit from the teachings below while remaining within the scope of the present disclosure as well.

In a specific example, at block 802 the system provider may provide (via a system provider device) a webpage or application that allows for the reporting of the details of the loan at block 802. As such, one or more parties to the loan may utilize that webpage or application to identify each party to the loan (e.g., via a name, a pseudonym, an account number, a public ledger address, and/or any other unique identifier known in the art), an amount of the loan, a payment term of the loan, an interest rate for the loan, and/or any other loan details known in the art. In some embodiments, a single party to a loan may enable the performance of the method 800, while in other embodiments, both parties to the loan may be required to confirm the details of the loan in order to enable the performance of the method 800.

The method 800 then proceeds to block 804 where the system provider provides the details of the loan on a public ledger. In an embodiment, at block 804 the system provider uses the details of the loan reported at block 802 to identify the loan on the public ledger 408. In one example, the loan may involve a loan made via a transaction on the public ledger (e.g., the loan amount may have been transferred via a transfer of electronic coins between the parties as discussed above), and the reporting of the loan at block 802 may identify the public ledger addresses that were used to make that transfer. At block 804, the system provider may then associate any other details reported at block 802 (e.g., the payment term of the loan, the interest rate for the loan, and/or any other loan details) with that transaction. In some embodiments, the details associated with the loan transaction may be made available on a public website provided by the system provider, or otherwise made available to the parties to the loan and, in some situations, made available to entities that are not necessarily parties to the loan.

As discussed above, the loan may involve a peer-to-peer loan made privately (or "off platform") between the parties. At block 804, the system provider may perform a transaction on the public ledger between two public ledger addresses that are both controlled by the system provider, and associate the public ledgers addresses used in that transaction with the parties to the loan. In one example, the transaction performed by the system provider at block 804 may be for the reported loan amount, while in other examples, the transaction performed by the system provider at block 804 may be for a nominal amount that may be based on the reported loan amount (e.g., a 10 electronic coin loan may be represented by a 0.01 electronic coin transfer between public ledger addresses controlled by the system provider). Furthermore, any other details reported at block 802 (e.g., the payment term of the loan, the interest rate for the loan, and/or any other loan details) may be associated with that transaction. In some embodiments, the details associated with the loan transaction may be made available on a public website provided by the system provider, or otherwise made available to the parties to the loan and, in some situations, entities that are not necessarily parties to the loan.

The method 800 then proceeds to block 806 where one or more parties to the loan report payments event(s) to the system provider. In an embodiment, at block 806 the system provider receives loan report payment events from the one or more parties involved in the loan. Similarly as discussed above, the system provider may provide (via the system provider device) the webpage or application that allows for the reporting of loan report payment events at block 806. As such, one or more parties to the loan may utilize that webpage or application to identify the making of a loan repayment, identify the receiving of a loan repayment, identify a change in loan details (e.g., an interest rate change), and/or report any other loan payment event known in the art.

The method 800 then proceeds to block 808 where the system provider provides the details of the loan repayment event(s) on the public ledger. In an embodiment, at block 808 the system provider uses the details of the loan repayment event reported at block 806 to identify the loan that was provided on the public ledger 408 at block 804. In one example, the loan repayment event may involve a loan repayment made via a transaction on the public ledger (e.g., the loan repayment amount may have been transferred via a transfer of electronic coins between the parties as discussed above), and the reporting of the loan repayment event at block 806 may identify the public ledger addresses that were used to make that transfer. At block 808, the system provider may then associate any other details reported at block 806 (e.g., the amount of the repayment, the date of the repayment, the time of the repayment, the principle/interest breakdown for the repayment, and/or any other loan repayment event details) with that transaction. In some embodiments, the details associated with the loan repayment event may be made available in association with the loan on a public website provided by the system provider, or otherwise made available to the parties to the loan and, in some situations, entities that are not necessarily parties to the loan.

Similarly as discussed above, the loan repayment event may involve a peer-to-peer loan repayment event made privately (or "off platform") between the parties. At block 808, the system provider may perform a transaction on the public ledger between the two public ledger addresses that are both controlled by the system provider, and associate the public ledgers addresses used in that transaction with the parties to the loan. In one example, the transaction performed by the system provider at block 804 may be for the reported loan repayment amount, while in other examples, the transaction performed by the system provider at block 804 may be for a nominal amount that may correspond to the loan repayment amount (e.g., a loan for 10 electronic coins may be provided on the public ledger by an electronic coin transaction of 0.01 electronic coins, and a loan repayment of 0.5 electronic coins may then be provided on the public ledger by an electronic coin transaction of 0.0005 electronic coins). Furthermore, any other details reported at block 806 (e.g., the date of the repayment, the time of the repayment, the principle/interest breakdown for the repayment, and/or any other loan repayment event details) may be associated with that transaction. In some embodiments, the details associated with the loan transaction may be made available on a public website provided by the system provider, or otherwise made available to the parties to the loan and, in some situations, entities that are not necessarily parties to the loan.

Thus, a method for tracking on and off platform loans using a public ledger has been described that allows parties to a loan to report detail of that loan, as well as subsequent loan repayment details, and have that loan posted to a public ledger. Following the posting of any information about the loan to the public ledger, any party with access to the public ledger may review the history of the loan and may track loan repayment events as they occur. The authentication of the parties to the loan via the public ledger authentication system discussed above, may be beneficial in confirming the identity of the parties to the loan or making payment on the loan, but is not necessary in all embodiments.

Figure 9:
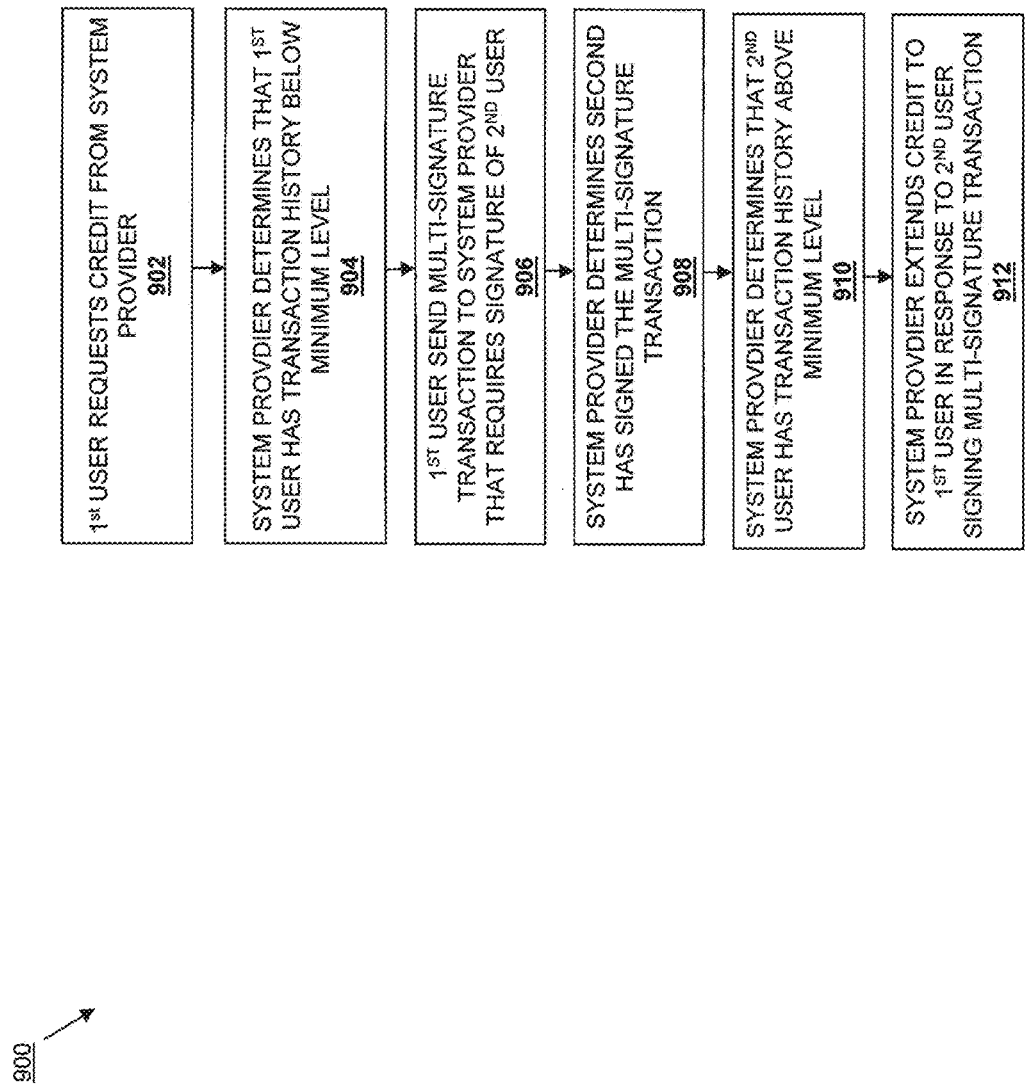
FIG. 9 is a schematic view illustrating an embodiment of a computer system.

Referring now to FIG. 9, an embodiment of a method 900 for providing credit endorsements is illustrated. As discussed below, the method 900 allows a first user that is requesting credit to send a multi-signature transaction to a system provider that requires the signature of a second user. If the system provider determines that the second user has a transaction history at a minimum level, and the second user signs the multi-signature transaction, the system provider may interpret that signing of the multi-signature transaction as an endorsement of the first user and may extend credit to that first user in response. As such, users (and particularly businesses) that have sufficient transaction histories with a credit provider or other system provider may vouch for users that do not in order to allow those users with low transaction histories to receive credit from a credit provider or other system provider operating to perform the method 900. In at least some embodiments, the method 900 may benefit from the public ledger authentication methods discussed above by, for example, verifying the identity of the user requesting credit and/or verifying the identity of the user providing the endorsement. However, in other embodiments, the method 900 may operate without the need to perform the public ledger authentication methods discussed above, or using conventional authentication methods that would be apparent to one of skill in the art in possession of the present disclosure.

The method 900 begins at block 902 where a first user requests credit from a system provider. In an embodiment, the system provider may be a payment service provider such as PayPal, Inc. of San Jose, Calif. However, in other embodiments, the system provider may be a bank or other loan provider known in the art. In yet another embodiment, the system provider (e.g., a payment service provider) may provide loan endorsement capabilities for a credit provider (e.g., a bank) according to the method 900. At block 902, the first user may use a first user device to request credit from the system provider. For example, the first user may attempt to purchase a product from a merchant via a merchant website, and may be redirected to the system provider during that transaction to obtain credit to purchase that product. As such, the request for credit by the first user from the system provider may be performed via a website or application provided by the system provider, or may be received via such a website or application and forwarded to the system provider. The request for credit received by the system provider at block 902 may include identification information for the first user (e.g., a name, address, social security number, etc.), a requested credit amount, the product to be purchase using the credit, an interest rate for the credit, and/or any other credit information that would be apparent to one of skill in the art in possession of the present disclosure.

The method 900 then proceeds to block 904 where the system provider determines that the first user has a transaction history that is below a minimum level. In an embodiment, at block 904, the system provider uses the identity of the first user to access a user transaction database that associates users with their transactions. For example, the system provider may store transaction histories of users in a database, and may access that database at block 904. In another example, the system provider may have access to user transaction history database compiled by third parties (e.g., credit providers, merchants, banks, etc.), and may access those transaction history databases at block 904. The system provider may then retrieve all the transactions that are available for the first user, and make a determination of whether those transactions are below a minimum level.

In different embodiments, the determination at block 904 of whether the transactions available for the first user are below a minimum level may be made in a variety of manners and in consideration of a variety of characteristics. For example, the determination may be a determination of whether a minimum number of transactions have been performed by the first user, and at block 904 the system provider may determine whether the number of transactions available for the first user is below a minimum number of transactions necessary to receive credit. In another example, the determination may be a determination of whether a total transaction amount for the transactions available for the first user have been performed, and at block 904 the system provider may determine whether the total transaction amount of the transactions available for the first user is below a minimum transaction amount that is necessary to receive credit. In another example, the determination may be a determination of the types of transactions available for the first user, and at block 904 the system provider may determine whether the types of transactions available for the first user include one or more types of transactions that are necessary to receive credit. In another example, the determination may be a determination of the results of transactions available for the first user, and at block 904 the system provider may determine whether the results of transactions available for the first user include one or more results of transactions that are necessary to receive credit. While several examples have been provided, one of skill in the art in possession of the present disclosure will recognize that the transactions of the first user may be analyzed for a variety of characteristics to determine whether credit should be provided while remaining within the scope of the present disclosure.

In some embodiments, the system provider may obtain the transaction history of the first user by retrieving public ledger addresses used in transactions by the first user. For example, in response to the first user requesting credit, the system provider may request a transaction history from the transaction wallet 504b, and the transaction wallet 504b may provide each of the public legers addresses from which electronic coins have been sent in crypto currency transactions. Using those public ledger addresses, the system provider may then access all transactions performed by the first user using those public ledger addresses.

In response to determining at block 904 that the first user has a transaction history below the minimum level, the system provider may notify the first user (e.g., via the website or application) that their transaction history is insufficient. In addition, the system provider may notify the first user that they may be eligible to receive the credit if they can provide the endorsement of a second user with a sufficient transaction history. In some examples, the first user may be eligible to receive the credit based on the endorsement of a user with a sufficient transaction history if the first user has a transaction history below the minimum level but above some level that prevents the system provider from providing credit to the first user under any circumstances. However, in other examples, the endorsement of a user with an appropriate transaction history may allow the first user to obtain credit even when the first user has very limited transaction history, or even completely lacks a transaction history.

At block 904, the system provider may suggest users to whom the first user should solicit an endorsement. In an embodiment, the system provider device may analyze the transaction history of the first user and identify a second user with whom the first user has conducted at least one transaction and suggest that the first user solicit an endorsement from the second user. For example, the system provider device may suggest that the first user solicit an endorsement from the second user in response to determining that the first user has performed a minimum number of transactions with the second user, or in response to determining that the first user has performed at least one transaction for a minimum total amount. In addition, any second user identified by the system provider from the transaction history of the first user may only be suggested to the first user in response to determining that the second user has a transaction history above a minimum level or is otherwise qualified or determined by the system provider to provide an endorsement. However, in other embodiments, the first user may select a second user from which to solicit an endorsement without assistance from the system provider.

The method 900 then proceeds to block 906 where the first user sends the system provider a multi-signature transaction that requires the signature of the second user. In an embodiment, prior to block 906, the first user may contact the second user to inform the second user that the first user intends to solicit an endorsement. In some examples, contacting the second user by the first user may be performed with the assistance of the system provider (e.g., via a webpage or application that allows the first user to contact the second user). At block 906, the first user creates a multi-signature transaction that requires the second user's signature and that transfers some amount of electronic coins to the system provider. In different embodiments, the amount of electronic coins designated for transfer in the multi-signature transaction may be a nominal amount, and may be based on an identifier the system provider has provided for the first user (e.g., the first user may be identified by a transfer of 0.0001234 electronic coins).

In an embodiment, the first user uses their user device to create a multi-signature transaction that is directed to the system provider and that includes the second user as a signing party. One of skill in the art in possession of the present disclosure will recognize that the first user may create the multi-signature transaction that identifies an amount of funds to transfer, identifies the system provider as the destination of the funds, and includes the second party as a signing party. For example, the multi-signature transaction created at block 906 may require signatures using both of a private key available to the first user and a private key available to the second user in order for that transaction to transfer the identified funds from the first user to the system provider. As such, the first user device and/or the second user device may gather (or generate) public ledger addresses on the first user device and the second user device, obtain public keys from the first user device and/or the second user device, and create a multi-signature transaction address for the multi-signature crypto-currency transaction. At block 906, the first user may then create a transaction that identifies the system provider as a destination of funds, and send that transaction to the multi-signature transaction address.

The method 900 then proceeds to block 908 where the system provider determines that the second user has signed the multi-signature transaction. At block 908, the second user may determine that they wish to endorse the first user for obtaining credit from the system provider. As such, at block 908 the second user may use a private key associated with the multi-signature transaction address to sign the multi-signature transaction created by the first user at block 906. In response to the second user signing the multi-signature transaction, electronic coins designated for transfer in the multi-signature transaction may be transferred from the multi-signature transaction address to a public ledger address controlled by the system provider. As such, the system provider may determine at block 908 that the second user has signed the multi-signature transactions in response to determining that electronic coins designated by that multi-signature transaction have been transferred to a public ledger address controller by the system provider.

The method 900 then proceeds to block 910 where the system provider determines that the second user has a transaction history above a minimum level. In some embodiments, the determination that the second user has the transaction history above the minimum level may be performed when the system provider suggests the second user to the first user for solicitation of an endorsement, as discussed above. However, in embodiments where the first user selects a second user from which to receive an endorsement, block 910 may be performed following the receipt of the multi-signature transaction at block 906 and/or the second user signing the multi-signature transaction at block 908.

In an embodiment, at block 910, the system provider uses the identity of the second user to access a user transaction database that associates users with their transactions. As discussed above, the system provider may store transaction histories of users in a database, and may access that database at block 910. As also discussed above, the system provider may have access to user transaction history databases compiled by third parties (e.g., credit providers, merchants, banks, etc.), and may access those transaction history databases at block 910. The system provider may then retrieve all the transactions that are available for the second user, and make a determination of whether those transactions are above a minimum level.

In different embodiments, the determination at block 910 of whether the transactions available for the second user are above a minimum level may be made in a variety of manners. For example, the determination may be a determination of whether a minimum number of transactions have been performed by the second user, and at block 910 the system provider may determine that the number of transactions available for the second user is above a minimum number of transactions necessary to successfully endorse another user for credit. In another example, the determination may be a determination of whether a total transaction amount for the transactions available for the second user have been performed, and at block 910 the system provider may determine that the total transaction amount of the transactions available for the second user is above a minimum transaction amount that is necessary to successfully endorse another user for credit. In another example, the determination may be a determination of the types of transactions available for the second user, and at block 910 the system provider may determine that the types of transactions available for the second user include one or more types of transactions that are necessary to successfully endorse another user for credit. In another example, the determination may be a determination of the results of transactions available for the second user, and at block 904 the system provider may determine that the results of transactions available for the second user include one or more results of transactions that are necessary to successfully endorse another user for credit. While several examples have been provided, one of skill in the art in possession of the present disclosure will recognize that the transactions of the second user may be analyzed for a variety of characteristics to determine whether the endorsement of the second user is sufficient to provide credit to the first user while remaining within the scope of the present disclosure.

In some embodiments, the system provider may obtain the transaction history of the second user by retrieving public ledger addresses used in transactions by the second user. For example, in response to the second user signing the multi-signature transaction, the system provider may request a transaction history from the transaction wallet 504b of the second user, and the transaction wallet 504b may provide each of the public ledger addresses from which electronic coins have been sent in crypto currency transactions. Using those public ledger addresses, the system provider may then access all transactions performed by the second user using those public ledger addresses.

The method 900 then proceeds to block 912 where the system provider extends credit to the first user in response to the second user signing the multi-signature transaction. At block 912, the system provider may extend the credit requested by the first user to the first user in order to purchase the product. Thus, a method for providing credit endorsements has been described that allows users to endorse other users via signing of a multi-signature transaction. The authentication of the first user and/or second user via the public ledger authentication system discussed above may be beneficial in confirming the identity of the parties to the loan or making payment on the loan, but is not necessary in all embodiments.

Figure 10:
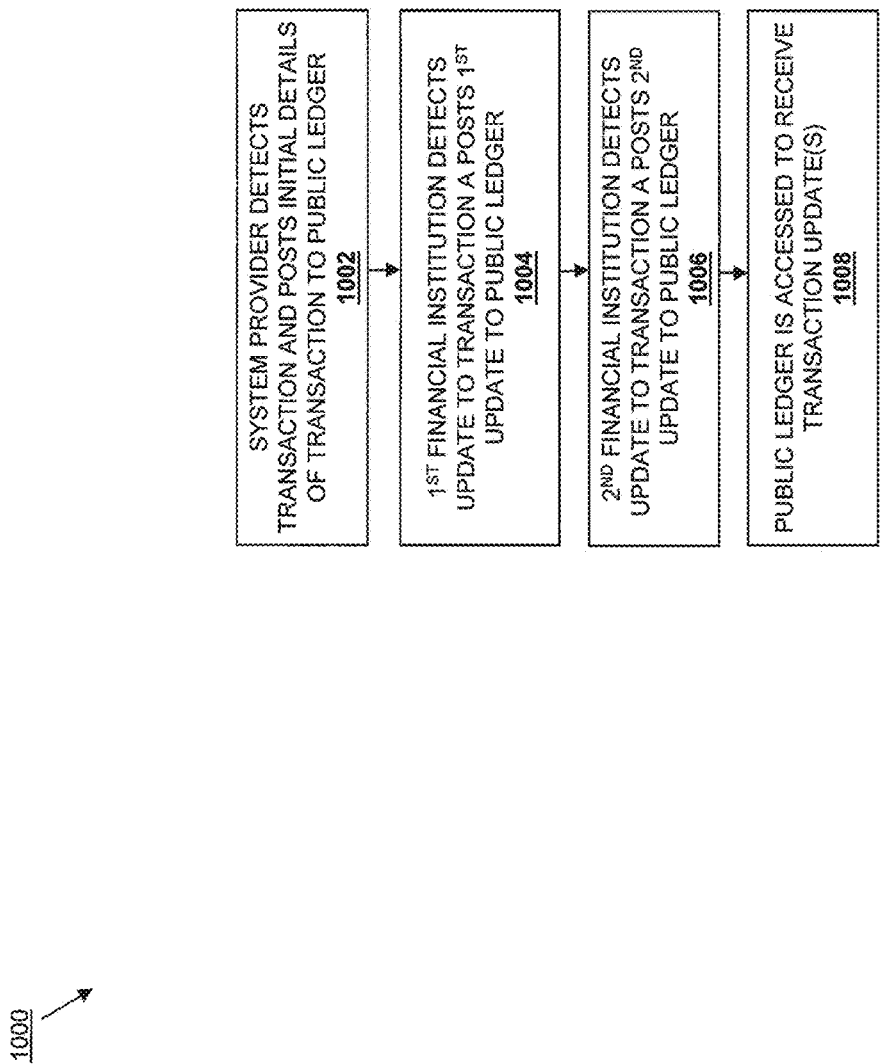
FIG. 10 is a schematic view illustrating an embodiment of a system provider device.

Referring now to FIG. 10, an embodiment of a method 1000 for providing a transaction activity repository is illustrated. As discussed below, the method 1000 allows a system provide to create a transaction repository by posting the details of transactions to a public ledger, and then allowing parties involved in the transaction to update that transaction by posting updates to the public ledgers, which allows the varied parties typically involved in any given transaction to retrieve almost immediate updates on the status of a transaction. As such, any party to a transaction can access the public ledger and determine the status of any current transactions being tracked by the system. In at least some embodiments, the method 1000 may benefit from the public ledger authentication methods discussed above by, for example, verifying the identity of parties to the transaction and/or the institutions involved in carrying out the transaction. However, in other embodiments, the method 1000 may operate without the need to perform the public ledger authentication methods discussed above, or using conventional authentication methods that would be apparent to one of skill in the art in possession of the present disclosure.

The method 1000 begins at block 1002 where the system provider detects a transaction and posts initial details of the transaction to the public ledger. In an embodiment, the system provider may be provided by a payment service provider, and that payment service provider may operate with financial institutions such as a bank institution, a credit institution, and/or other financial institutions to provide a public ledger that may only be accessible by each of those entities. At block 1002, the system provider may detect a transaction initiated by a user and identify the initial details about that transaction. For example, at block 1002 the system provider may identify a product that is the subject of the transaction, an amount of the transaction, the parties to the transaction (e.g., the user and a merchant), the date/time of the transaction, and/or any other information about the transaction that would be apparent to one of skill in the art in possession of the present disclosure.

At block 1002, the system provider posts the initial details of the transaction to the public ledger. In an embodiment, at block 1002 the system provider may associate a public ledger address with the transaction and transfer some amount of electronic coins from that public ledger address to another public ledger address on the public ledger. Further, the system provider may provide any details about the transaction being posted to the public ledger as metadata in the transaction that transfers the amount of electronic coins from that public ledger address to another public ledger address on the public ledger. Following block 1002, the transaction by the user may be considered "opened" with initial details of that transaction posted to the public ledger.

The method 1000 may then proceed to block 1004 where a first financial institution detects an update to the transaction and posts a first update to the public ledger. In an embodiment, the first financial institution may detect an update to the transaction involving user and identify the details of the update for that transaction. For example, at block 1004 the first financial institution (e.g., a credit financial institution) may identify an update to the transaction that was detected by the system provider and posted to the public ledger at block 1002. For example, an update to the transaction may include that transaction posting to the credit account of the user. At block 1004, the first financial institution posts the first update for the transaction to the public ledger. In an embodiment, at block 1004 the first financial institution may associate a ledger address with the transaction update and transfer an amount of electronic coins from that public ledger address to another public ledger address on the public ledger. Further, the first financial institution may provide any details about the update to the transaction being posted to the public ledger as metadata in the transaction that transfers the amount of electronic coins from that public ledger address to another public ledger address on the public ledger. Following block 1004, the transaction by the user may be considered "updated" with initial details of that transaction and a first update for that transaction posted to the public ledger.

The method 1000 may then proceed to block 1006 where a second financial institution detects an update to the transaction and posts a second update to the public ledger. In an embodiment, the second financial institution may detect an update to the transaction and identify the details of the update for that transaction. For example, at block 1006 the second financial institution (e.g., a bank financial institution) may identify an update to the transaction that was detected by the system provider and posted to the public ledger at block 1002, and then updated by the first financial institution at block 1004. For example, an update to the transaction may include the bank financial institution providing payment to the credit financial institution. At block 1006, the second financial institution posts the second update for the transaction to the public ledger. In an embodiment, at block 1006 the second financial institution may associate a ledger address with the transaction update and transfer an amount of electronic coins from that public ledger address to another public ledger address on the public ledger. Further, the second financial institution may provide any details about the update to the transaction being posted to the public ledger as metadata in the transaction that transfers the amount of electronic coins from that public ledger address to another public ledger address on the public ledger. Following block 1006, the transaction by the user may be considered "updated" with initial details of that transaction, a first update for that transaction, and a second update for the transaction posted to the public ledger.

One of skill in the art in possession of the present disclosure will recognize that any number of financial institutions may provide updates for the transaction on the public ledger in a manner similar to that discussed above for the first financial institution and the second financial institution. As such, the details of the transaction may be updated until the transaction has been closed by all of the parties involved in it. As such, block 1008 may be performed at any time during the method 1000 by any party configured to access the public ledger in order to receive updates about the transaction. Thus, in different embodiments, the payment service provider, the first financial institution, the second financial institution, other financial institutions, the user, the merchant, and/or other parties involved in the transaction may access the public ledger, identify that transaction and its associated updates in the public ledger, and determine the current status of the transaction. Similarly, the parties to the transaction (e.g., the user and the merchant) may provide updates about chargebacks, refunds, refund refusals, and/or other transaction events to allows the parties involved in the transaction to identify when a user has initiated a chargeback, whether a merchant has provided a refund or refused that refund, and/or identify any other transaction status updates known in the art. Further still, when a credit account is associated with the transaction, the account number may be associated with the transaction in the public ledger, and that account number may be tracked by the system provider, the credit financial institution, and/or the bank financial institution in order to identify credit abuses or irregularities.

Figure 11:
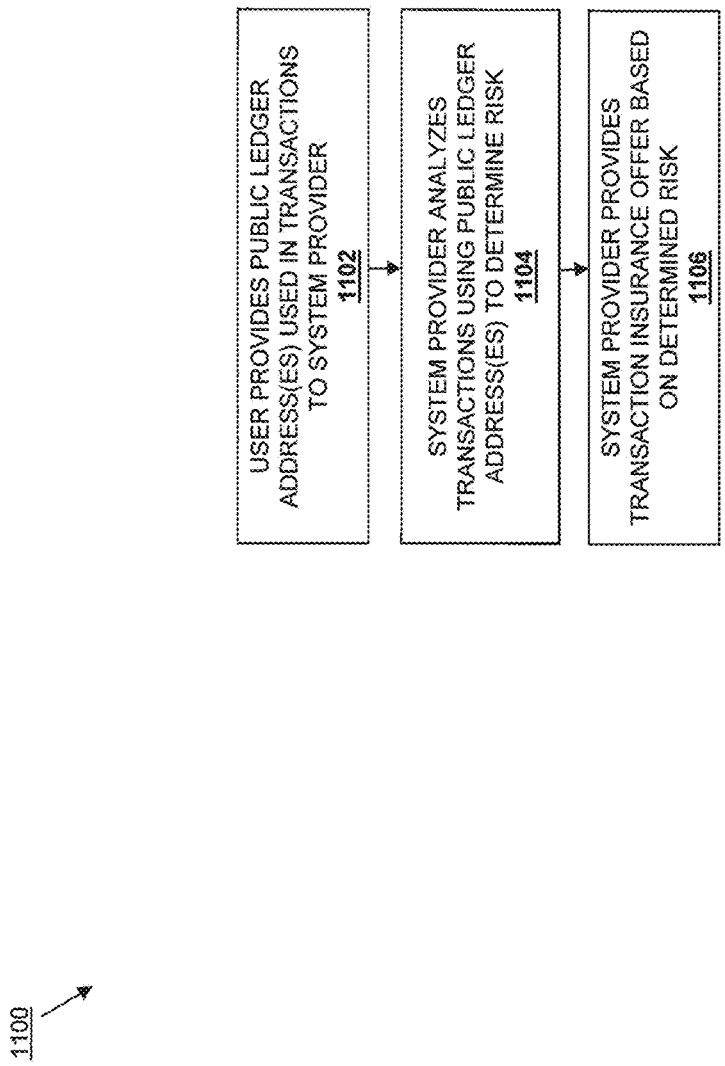
FIG. 11 is a flow chart illustrated an embodiment of a method for providing transaction insurance.

Referring now to FIG. 11, an embodiment of a method 1100 for providing transaction insurance is illustrated. As discussed below, the method 1100 allows a user to provide public ledger addresses used in transactions to a system provider in order to have that system provider analyze the transactions on the public ledger to determine a risk association with conducting a future transaction with the user, and possibly provide transaction insurance based on the determined risk. As such, previous transactions by a user on a public ledger may be used to identify risk associated with a future transaction with the user, which may be utilized in providing insurance for those future transactions, "on-boarding" those users to a payment or transaction platform, and/or providing a variety of other benefits that would be apparent to one of skill in the art in possession of the present disclosure. In at least some embodiments, the method 1100 may benefit from the public ledger authentication methods discussed above by, for example, verifying the identity of the user associated with the transaction history. However, in other embodiments, the method 1100 may operate without the need to perform the public ledger authentication methods discussed above, or using conventional authentication methods that would be apparent to one of skill in the art in possession of the present disclosure.

The method 1100 begins at block 1102 where a user provides public ledger addresses used in transactions to a system provider. In an embodiment, the system provider may provide a webpage or application that allows the user to provide the public ledger addresses used in previous transactions. For example, the user may instruct the transaction wallet 504*b* to provide each public ledger address that has been used in a previous transaction over a network to a system provider device of the system provider via the webpage or application. In some embodiments, the user may be able to edit or define which transactions will be provided to the system provider (e.g., via a transaction type, a minimum transaction amount, a transaction date range, etc.). However, in other embodiments, the transaction wallet 504*b* may be required to send all previous transactions (or all previous transactions of a particular type, in a particular date range, etc.) to the system provider in order to participate in the method 1100.

The method 1100 then proceeds to block 1104 where the system provider analyzes the transactions using the public ledger addresses to determine a risk of participating in a future transaction with the user. In an embodiment, the system provider may access the public ledger 408 and use the public ledger addresses provided by the user to identify the transactions conducted using those public ledger addresses. The identification of the transactions conducted by the user, as well as any metadata or transaction updates associated with those transactions, allows the system provider to determine the amounts associated with those transactions, whether any chargeback was initiated for those transactions, and/or any other details that allow for the determination of risk In different embodiments, the risk determination may be conducted by the system provider by assessing the fraud and/or credit risk of the sending party, the receiving party (e.g., using the size of the receiving party, a category the receiving party belongs to, a tenure of the receiving party, a tenure of the receiving party on the public ledger, a tenure known to the system provider of the receiving party on the public ledger, any linked public ledger accounts of the receiving party that may be explicitly mentioned or implicitly derived, etc.) or intermediaries in the transaction. Further qualification can be made on the basis of other transaction details such as the item purchased, the location of the transaction, the frequency of transactions by the parties, etc. to detect anomalies in patterns that may deem a transaction high or low risk in nature. Thus, using the transactions retrieved from the public ledger via the public ledger addresses identified by the user at block 1102, the system provider device may quantify the risk associated with a future transaction with the user. That quantification of risk may be for a future transaction that is similar to the types of transaction identified via the public ledger addresses, a future transaction that is for a similar amount as the transactions identified via the public ledger addresses, and/or based on any other characteristics of the future transaction that would be apparent to one of skill in the art in possession of the present disclosure.

The method 1100 then proceeds to block 1106 where the system provider provides a transaction insurance offer based on the determined risk. In an embodiment, at block 1106 the system provider may provide a transaction insurance offer to the user via, for example, the website or application through which the user provided the public ledger addresses at block 1102. For example, the transaction insurance offer may offer transaction insurance for any future transaction conducted using the public ledger, a particular transaction (e.g., for a particular transaction type, transaction in a particular transaction range, etc.), and/or depending on a variety of transaction characteristics that would be apparent to one of skill in the art in possession of the present disclosure.

In an embodiment, depending upon the system provider's assessment of the fraud or credit risk ("high", "low", or some specific score threshold), the system provider may recommend a decline of the transaction, or an approval of the transaction that is designated 'at your own risk' to the merchant, and/or an outright approval with an associated guarantee in the form of an insurance protection to either parties. Such services may be offered for free or for charge to either party to provide buyer protection and/or seller protection that are associated with fees that may be a flat rate, or based on transaction volume (e.g. insurance coverage for a period (e.g., 1 year) or up to a threshold (e.g., $100K) within a given time period. Payments for such insurance may be associated with a recurring charge.

In some embodiments, the system provider may approve a transaction in response to receiving a "step up" authentication or "step up" collateral that may be administered by either the system provider directly or by a merchant on behalf of the "step up" (e.g., a retail receiver agent at Point of Sale checking identifier. An example of collateral includes a deposit collected by the receiver's agent or directly by the system provider in form of a deposit or escrow.

In some embodiments, dynamic machine learning system may compute automated actuarial subsystems over time to insure a given transaction, and the risk determination logic discussed above can be used as input to this actuarial subsystem. In some examples, actuarial scores may be provided to other 3rd party insurers interested in insuring this public ledger transaction.

In some embodiments, block 1106 of the method 1100 may be replaced with the performance of an onboarding block by the system provider that operates to on-board the user to a platform. For example, the system provider may be a payment service provider that provides a payment service platform, and the user may be a merchant. In such examples, the payment service provide may use the history of transactions by the merchant that are retrieved via the public ledger addresses provided by block 1102 in order to on-board the merchant to the payment service platform by, for example, offering a score or an outright decision (approval, onboarding decline, approval with conditions, etc.) to 3rd parties or partners. For example, services such as Fair Issac (FICO) and D&B (Dun and Bradstreet) may be offered based on the assessment of the fraud or credit risk derived from knowledge of the public ledger transaction history, and these lookup services may be provided for a fee. IN a specific example, provider A may request a score from the system provider for Merchant B based on the history of merchant B on the public ledger, and the system provider may then render a score for Merchant B.

Thus, a method for utilizing a public ledger transaction history has been described that allows users to provide their transaction histories on a public ledger via the public ledger addresses they previously used in transactions. A system provider may then analyze those transaction histories to determine risk associated with future transactions by the user, to provide transaction insurance for future transactions by the user, and/or to on-board the user to a platform. The authentication of the user via the public ledger authentication system discussed above may be beneficial in confirming the identity of the user, but is not necessary in all embodiments.

Figure 12:
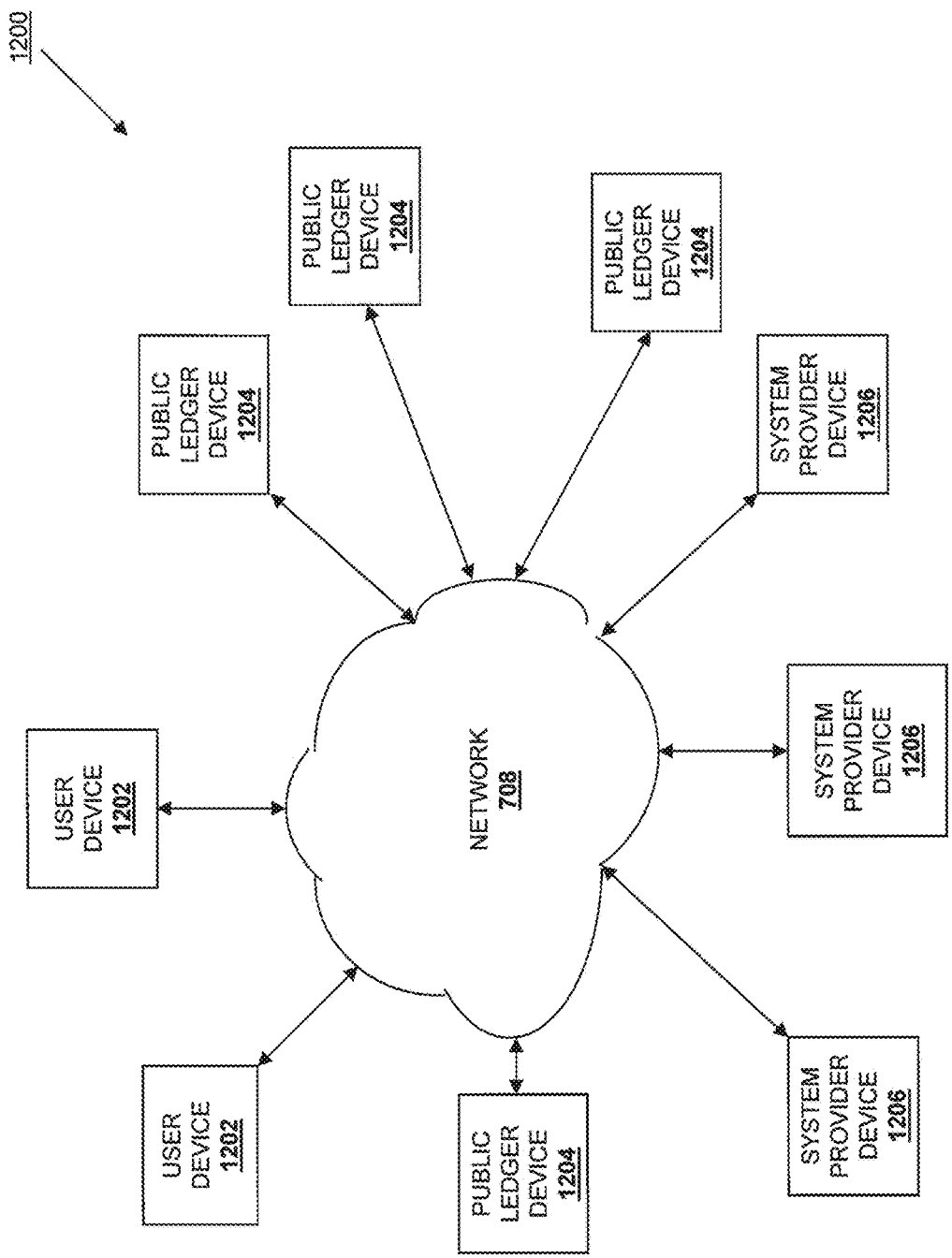
FIG. 12 is a schematic view illustrating an embodiment of a networked system.

Referring now to FIG. 12, an embodiment of a networked system 1200 used in the systems described above is illustrated. The networked system 1200 includes a plurality of user devices 1202, a plurality of public ledger devices 1204 and a plurality of system provider devices 1206 in communication over a network 1208. Any of the user devices 1202 may be the user devices operated by the users, discussed above. Any of the public ledger devices 1204 may be the public ledger devices discussed above. Any of the system provider devices 1206 may be the system provider devices operated by the system providers, discussed above.

The user devices 1202, public ledger devices 1204, and/or system provider devices 1206 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1200, and/or accessible over the network 1208.

The network 1208 may be implemented as a single network or a combination of multiple networks. For example, in various embodiments, the network 1208 may include the Internet and/or one or more intranets, landline networks, wireless networks, and/or other appropriate types of networks.

The user devices 1202 may be implemented using any appropriate combination of hardware and/or software configured for wired and/or wireless communication over network 1208. For example, in one embodiment, the user devices 1202 may be implemented as a personal computer of a user in communication with the Internet. In other embodiments, the user devices 1202 may be a smart phone, wearable computing device, laptop computer, and/or other types of computing devices.

The user devices 1202 may include one or more browser applications which may be used, for example, to provide a convenient interface to permit the payer to browse information available over the network 1208. For example, in one embodiment, the browser application may be implemented as a web browser configured to view information available over the Internet.

The user devices 1202 may also include one or more toolbar applications which may be used, for example, to provide user-side processing for performing desired tasks in response to operations selected by the user. In one embodiment, the toolbar application may display a user interface in connection with the browser application.

The user devices 1202 may further include other applications as may be desired in particular embodiments to provide desired features to the user devices 1202. In particular, the other applications may include a payment application for payments assisted by a payment service provider. The other applications may also include security applications for implementing user-side security features, programmatic user applications for interfacing with appropriate application programming interfaces (APIs) over the network 1208, or other types of applications. Email and/or text applications may also be included, which allow the user to send and receive emails and/or text messages through the network 1208. The user devices 1202 include one or more user and/or device identifiers which may be implemented, for example, as operating system registry entries, cookies associated with the browser application, identifiers associated with hardware of the user devices 702, or other appropriate identifiers, such as a phone number. In one embodiment, the user identifier may be used to associate the user with a particular account as further described herein.

Figure 13:
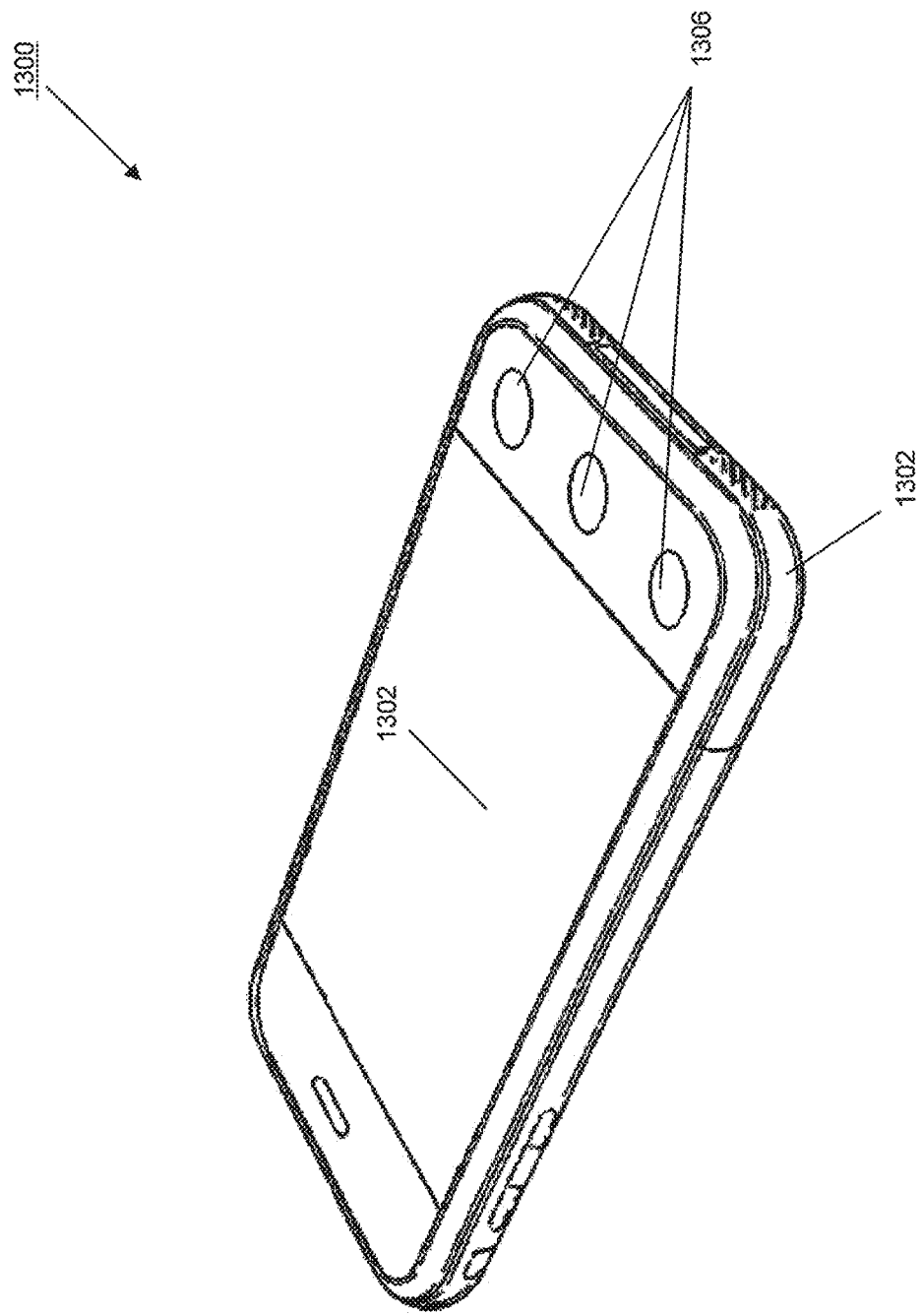
FIG. 13 is a perspective view illustrating an embodiment of a user device.

Referring now to FIG. 13, an embodiment of a user device 1300 is illustrated. The device 1300 may be any of the user devices discussed above. The device 1300 includes a chassis 1302 having a display 1304 and an input device including the display 1304 and a plurality of input buttons 1306. One of skill in the art will recognize that the device 1300 is a portable or mobile phone including a touch screen input device and a plurality of input buttons that allow the functionality discussed above with reference to the methods. However, a variety of other portable/mobile devices and/or desktop devices may be used in the method 100 without departing from the scope of the present disclosure.

Figure 14:
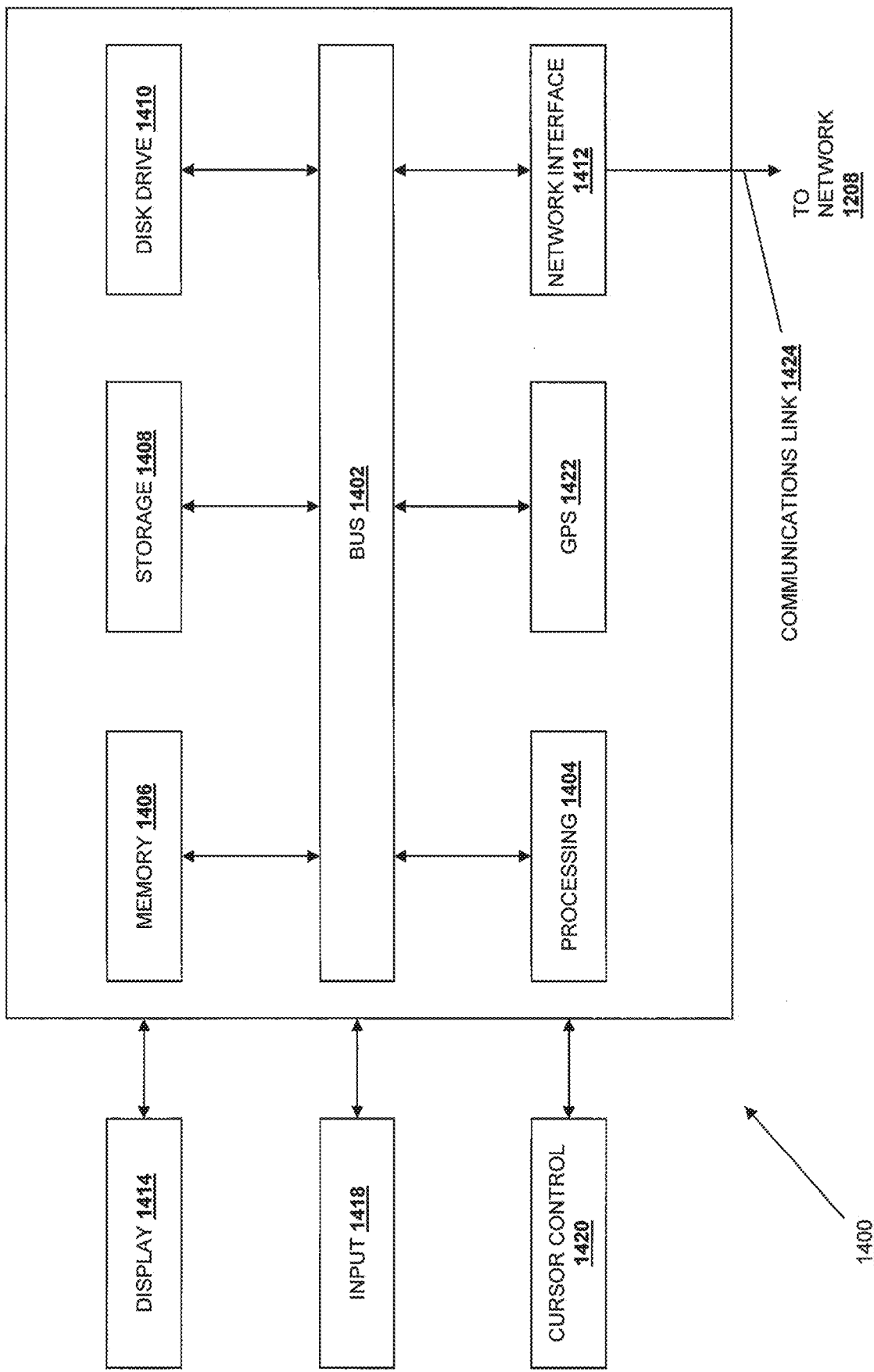
FIG. 14 is a schematic view illustrating an embodiment of a computer system.
Figure 15:
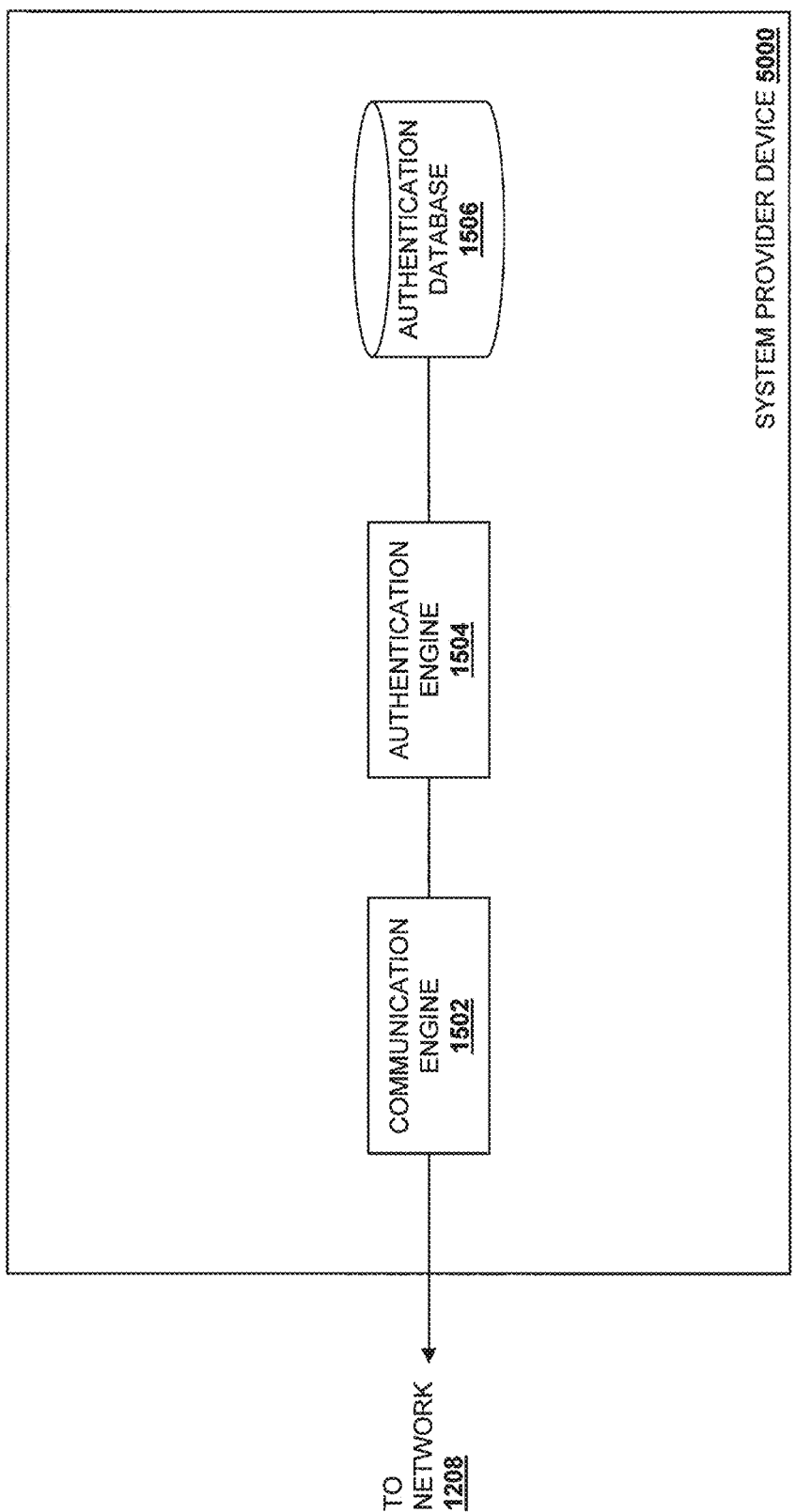
FIG. 15 is a schematic view illustrating an embodiment of a system provider device Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

Referring now to FIG. 14, an embodiment of a computer system 1400 suitable for implementing, for example, the user devices, public ledger devices, and/or system provider devices, is illustrated. It should be appreciated that other devices utilized in the public ledger authentication system discussed above may be implemented as the computer system 1400 in a manner as follows.

In accordance with various embodiments of the present disclosure, computer system 1400, such as a computer and/or a network server, includes a bus 1402 or other communication mechanism for communicating information, which interconnects subsystems and components, such as a processing component 1404 (e.g., processor, micro-controller, digital signal processor (DSP), etc.), a system memory component 1406 (e.g., RAM), a static storage component 1408 (e.g., ROM), a disk drive component 1410 (e.g., magnetic or optical), a network interface component 1412 (e.g., modem or Ethernet card), a display component 1414 (e.g., CRT or LCD), an input component 1418 (e.g., keyboard, keypad, or virtual keyboard), a cursor control component 1420 (e.g., mouse, pointer, or trackball), and/or a location determination component 1422 (e.g., a Global Positioning System (GPS) device as illustrated, a cell tower triangulation device, and/or a variety of other location determination devices known in the art). In one implementation, the disk drive component 1410 may comprise a database having one or more disk drive components.

In accordance with embodiments of the present disclosure, the computer system 1400 performs specific operations by the processor 1404 executing one or more sequences of instructions contained in the memory component 1406, such as described herein with respect to the payer devices, payee devices, user devices, payment service provider devices, and/or system provider devices. Such instructions may be read into the system memory component 1406 from another computer readable medium, such as the static storage component 1408 or the disk drive component 1410. In other embodiments, hard-wired circuitry may be used in place of or in combination with software instructions to implement the present disclosure.

Logic may be encoded in a computer readable medium, which may refer to any medium that participates in providing instructions to the processor 1404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1410, volatile media includes dynamic memory, such as the system memory component 1406, and transmission media includes coaxial cables, copper wire, and fiber optics, including wires that comprise the bus 1402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1400. In various other embodiments of the present disclosure, a plurality of the computer systems 1400 coupled by a communication link 1424 to the network 1208 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1400 may transmit and receive messages, data, information and instructions, including one or more programs (i.e., application code) through the communication link 1424 and the network interface component 1412. The network interface component 1412 may include an antenna, either separate or integrated, to enable transmission and reception via the communication link 1424. Received program code may be executed by processor 1404 as received and/or stored in disk drive component 1410 or some other non-volatile storage component for execution.

Referring now to FIG. 10, an embodiment of a system provider device 1500 is illustrated. In an embodiment, the device 1500 may be any of the system provider devices discussed above. The device 1500 includes a communication engine 1502 that is coupled to the network 1208 and to an authentication engine 1504 that is coupled to an authentication database 1506. The communication engine 1502 may be software or instructions stored on a computer-readable medium that allows the device 1500 to send and receive information over the network 1208. The authentication engine 1504 may be software or instructions stored on a computer-readable medium that is configured to perform the registration, authentication, and/or any of the other functionality that is discussed above. While the authentication database 1506 has been illustrated as a single database located in the device 1500, one of skill in the art will recognize that it may include multiple databases and be connected to the authentication engine 1504 through the network 1208 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A public ledger authentication system, comprising:
   a non-transitory memory; and
   one or more hardware processors coupled to the non-transitory memory and configured to read instructions from the non-transitory memory to cause the system to perform operations comprising:
   receiving, through a network from a payer device associated with a payer, a first previous authentication public ledger address that was used in a previous authentication attempt and a first current authentication public ledger address for use in a current authentication attempt;
   identifying a verified static user key in a public ledger using the first previous authentication public ledger address;
   providing, through the network to the payer device, a second current authentication public ledger address for use in the current authentication attempt;
   determining authentication attempt information that includes a number of authentication attempts by the payer;
   performing a hash operation using the authentication attempt information and the verified static user key to generate a first user authentication key;
   retrieving, through the network from the public ledger, a second user authentication key that was sent from the first current authentication public ledger address to the second current authentication public ledger address in a transaction in the public ledger;
   authenticating the user in response to the second user authentication key matching the first user authentication key;
   receiving, through the network from the payer device, an identification of a plurality of transaction public ledger addresses;
   analyzing the public ledger using the plurality of transaction public ledger addresses to identify a plurality of transactions that were each performed using a respective transaction public ledger address;
   identifying at least one payee involved in a subset of the plurality of transactions; and
   generating an automatic payment subsystem that is configured to perform an automatic payment to each of the at least one payee.

2. The system of claim 1, wherein the plurality of transaction public ledger addresses are received from a transaction wallet on the payer device that performed the transactions using the plurality of transaction public ledger addresses.

3. The system of claim 1, wherein the identifying the at least one payee involved in the subset of the plurality of transactions comprises:
   determining the subset of transactions involving the at least one payee includes a minimum number of transactions.

4. The system of claim 1, wherein the operations further comprise:
   determining that a first subset of the plurality of transactions involving a first payee of the at least one payee each occurred during a reoccurring time period; and
   generating the automatic payment subsystem that is configured to perform the automatic payment to the payee at the reoccurring time period.

5. The system of claim 1, wherein the operations further comprise:
   determining that a first subset of the plurality of transactions involving a first payee of the at least one payee each include the same payment amount; and
   generating the automatic payment subsystem that is configured to perform the automatic payment to the payee for the same payment amount.

6. The system of claim 1, wherein the operations comprise:
   analyzing a first subset of the plurality of transactions involving a first payee;
   determining an automatic payment amount based on previous payment amounts provided by the first subset of the plurality of transactions involving the first payee; and
   including the automatic payment amount in a first automatic payment generated by the automatic payment subsystem to the first payee.

7. A method, comprising:
   receiving, by a system provider device through a network from a payer device, a first previous authentication public ledger address that was used in a previous authentication attempt and a first current authentication public ledger address for use in a current authentication attempt;

identifying, b the system provider device, a verified static user key in a public ledger using the first previous authentication public ledger address;

providing, by the system provider device through the network to the payer device, a second current authentication public ledger address for use in the current authentication attempt;

determining by the system provider device, authentication attempt information that includes a number of authentication attempts by the payer;

performing, by the system provider device, a hash operation using the authentication attempt information and the verified static user key;

generating a first user authentication key based on the performing;

retrieving, by the system provider device through the network from the public ledger, a second user authentication key that was sent from the first current authentication public ledger address to the second current authentication public ledger address in a transaction in the public ledger;

determining a match between the second user authentication key and the first user authentication key;

authenticating, by the system provider device, based on the match;

receiving, by the system provider device through the network from the payer device, an identification of a plurality of transaction public ledger addresses;

analyzing, by the system provider device, a public ledger using the plurality of transaction public ledger addresses to identify a plurality of transactions that were each performed using a respective transaction public ledger address;

identifying, by the system provider device, at least one payee involved in a subset of the plurality of transactions; and generating, by the system provider device, an automatic payment subsystem that is configured to perform an automatic payment to each of the at least one payee.

8. The method of claim 7, wherein the plurality of transaction public ledger addresses are received from a transaction wallet on the payer device that performed the transactions using the plurality of transaction public ledger addresses.

9. The method of claim 7, wherein the identifying the at least one payee involved in the subset of the plurality of transactions comprises:

determining, by the system provider device, the subset of transactions involving the at least one payee includes a minimum number of transactions.

10. The method of claim 7, further comprising:

determining, by the system provider device, that a first subset of the plurality of transactions involving a first payee of the at least one payee each occurred during a reoccurring time period; and generating, by the system provider device, the automatic payment subsystem that is configured to perform the automatic payment to the payee at the reoccurring time period.

11. The method of claim 7, further comprising:

determining, by the system provider device, that a first subset of the plurality of transactions involving a first payee of the at least one payee each include the same payment amount; and generating, by the system provider device, the automatic payment subsystem that is configured to perform the automatic payment to the payee for the same payment amount.

12. The method of claim 7, further comprising:

analyzing, by the system provider device, a first subset of the plurality of transactions involving a first payee;

determining, by the system provider device, an automatic payment amount based on previous payment amounts provided by the first subset of the plurality of transactions involving the first payee; and including, by the system provider device, the automatic payment amount in a first automatic payment generated by the automatic payment subsystem to the first payee.

13. The method of claim 7, further comprising:

erasing, by the system provider device, the user identification information and the first user static key from the at least one database.

14. A non-transitory machine-readable medium having stored thereon machine-readable instructions executable to cause a machine to perform operations comprising:

receiving, through a network from a payer device associated with a payer, a first previous authentication public ledger address that was used in a previous authentication attempt and a first current authentication public ledger address for use in a current authentication attempt;

identifying a verified static user key in a public ledger using the first previous authentication public ledger address;

providing, through the network to the payer device, a second current authentication public ledger address for use in the current authentication attempt;

determining authentication attempt information that includes a number of authentication attempts by the payer;

performing a hash operation using the authentication attempt information and the verified static user key to generate a first user authentication key;

retrieving, through the network from the public ledger, a second user authentication key that was sent from the first current authentication public ledger address to the second current authentication public ledger address in a transaction in the public ledger;

authenticating the user in response to the second user authentication key matching the first user authentication key;

receiving, through the network from the payer device, an identification of a plurality of transaction public ledger addresses;

analyzing a public ledger using the plurality of transaction public ledger addresses to identify a plurality of transactions that were each performed using a respective transaction public ledger address;

identifying at least one payee involved in a subset of the plurality of transactions; and generating an automatic payment subsystem that is configured to perform an automatic payment to each of the at least one payee.

15. The non-transitory machine-readable medium of claim 14, wherein the plurality of transaction public ledger addresses are received from a transaction wallet on the payer device that performed the transactions using the plurality of transaction public ledger addresses.

16. The non-transitory machine-readable medium of claim 14, wherein the identifying the at least one payee involved in the subset of the plurality of transactions comprises:

determining the subset of transactions involving the at least one payee includes a minimum number of transactions.

17. The non-transitory machine-readable medium of claim 14, wherein the operations further comprise:

determining that a first subset of the plurality of transactions involving a first payee of the at least one payee each occurred during a reoccurring time period; and generating the automatic payment subsystem that is configured to perform the automatic payment to the payee at the reoccurring time period.

18. The non-transitory machine-readable medium of claim 14, wherein the operations further comprise:

determining that a first subset of the plurality of transactions involving a first payee of the at least one payee each include the same payment amount; and generating the automatic payment subsystem that is configured to perform the automatic payment to the payee for the same payment amount.

19. The non-transitory machine-readable medium of claim 14, wherein the operations comprise:

analyzing a first subset of the plurality of transactions involving a first payee;

determining an automatic payment amount based on previous payment amounts provided by the first subset of the plurality of transactions involving the first payee; and including the automatic payment amount in a first automatic payment generated by the automatic payment subsystem to the first payee.

20. The non-transitory machine-readable medium of claim 14, wherein the operations further comprise:

erasing the user identification information and the first user static key from the at least one database.

* * * * *